(12) United States Patent
Ishikawa et al.

(10) Patent No.: US 11,637,937 B2
(45) Date of Patent: Apr. 25, 2023

(54) INFORMATION PROCESSING APPARATUS, INFORMATION PROCESSING METHOD, AND NON-TRANSITORY STORAGE MEDIUM

(71) Applicant: CANON KABUSHIKI KAISHA, Tokyo (JP)

(72) Inventors: Akira Ishikawa, Kanagawa (JP); Naoya Kakutani, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/527,825

(22) Filed: Nov. 16, 2021

(65) Prior Publication Data

US 2022/0159130 A1 May 19, 2022

(30) Foreign Application Priority Data

Nov. 18, 2020 (JP) .............................. JP2020-191666
Nov. 18, 2020 (JP) .............................. JP2020-191668

(51) Int. Cl.
*H04N 1/00* (2006.01)
*G06V 30/10* (2022.01)
*G06V 30/32* (2022.01)

(52) U.S. Cl.
CPC ......... *H04N 1/00082* (2013.01); *G06V 30/32* (2022.01); *H04N 1/00013* (2013.01);
(Continued)

(58) Field of Classification Search
CPC .. G06V 30/10; G06V 10/225; G06V 30/1448; G06V 30/224; G06V 30/412; G06V 30/418; G06V 30/153; G06V 30/32; G06V 30/40; G06V 30/413; G06V 30/414; H04N 1/00968; H04N 1/04; H04N 1/00005; H04N 1/00015; H04N 1/00204; H04N 1/32272; H04N 1/56; H04N 1/00013; H04N 1/00037; H04N 1/00082; H04N 1/00331; H04N 1/00782; H04N 2201/0094; G06F 16/583; G01N 2021/95615;
(Continued)

(56) References Cited

U.S. PATENT DOCUMENTS 6,768,558 B1 * 7/2004 Yamashita ......... H04N 1/32229
                                                    358/1.9
8,812,493 B2 * 8/2014 Tankovich ............ G06F 16/951
                                                    707/722
(Continued)

FOREIGN PATENT DOCUMENTS

JP        2017076244 A      4/2017

*Primary Examiner* — Negussie Worku
(74) *Attorney, Agent, or Firm* — Canon U.S.A., Inc. IP Division

(57) ABSTRACT

A printed matter reviewed by a user is read, and a difference image is generated based on a first image obtained as a result of reading the printed matter and an electronic document that is a printing source from which the printed matter is generated. Based on the difference image, a process is performed to identify an instruction relating to a revision additionally written on the printed matter and a character string to be subjected to the revision in the electronic document. Thereafter, a particular process is executed on the electronic document based on the instruction related to the revision and the character string to which the revision is applied.

10 Claims, 17 Drawing Sheets

(52) U.S. Cl.
CPC ......... *H04N 1/00037* (2013.01); *G06V 30/10* (2022.01); *H04N 2201/0094* (2013.01)

(58) Field of Classification Search
CPC . G06T 2207/10024; G06T 2207/20021; G06T 2207/20224; G06T 2207/30144; G06T 2207/30168; G06T 2207/30176; G06T 7/0002; G06T 7/0004; G06T 7/001; G06T 7/30; G06T 7/337
USPC ........................................................ 358/1.15
See application file for complete search history.

(56) References Cited

U.S. PATENT DOCUMENTS

| | | | | |
|---|---|---|---|---|
| 10,127,215 | B2* | 11/2018 | Siwoff | G06F 40/169 |
| 2007/0229856 | A1* | 10/2007 | Komine | G06F 40/197 |
| | | | | 358/1.1 |
| 2008/0162567 | A1* | 7/2008 | Yamauchi | H04N 1/00912 |
| | | | | 707/E17.031 |
| 2010/0195152 | A1* | 8/2010 | Tokumaru | H04N 1/32229 |
| | | | | 726/28 |
| 2011/0249299 | A1* | 10/2011 | Wu | G06V 10/225 |
| | | | | 358/3.26 |
| 2012/0041752 | A1* | 2/2012 | Wang | G06F 9/454 |
| | | | | 704/8 |
| 2016/0012082 | A1* | 1/2016 | Choudhury | G06F 16/447 |
| | | | | 707/692 |
| 2016/0119500 | A1* | 4/2016 | Taniguchi | G06F 21/608 |
| | | | | 358/3.28 |
| 2018/0039582 | A1* | 2/2018 | Kakutani | H04L 63/0428 |
| 2018/0213020 | A1* | 7/2018 | Kakutani | H04L 63/0428 |
| 2020/0007347 | A1* | 1/2020 | Kakutani | H04L 9/3231 |
| 2021/0021719 | A1* | 1/2021 | Kobayashi | H04N 1/00225 |
| 2021/0144138 | A1* | 5/2021 | Kishimoto | H04L 63/20 |
| 2021/0398262 | A1* | 12/2021 | Iwano | H04N 1/00005 |
| 2021/0409559 | A1* | 12/2021 | Shiotani | H04N 1/00413 |
| 2022/0094799 | A1* | 3/2022 | Chiba | H04N 1/00037 |

* cited by examiner

INFORMATION PROCESSING APPARATUS, INFORMATION PROCESSING METHOD, AND NON-TRANSITORY STORAGE MEDIUM

BACKGROUND

Field of the Disclosure

The present disclosure relates to an information processing apparatus, an information processing method, and a program.

Description of the Related Art

In recent years, with the development of network technology and virtualization technology, various functions can be used by accessing a service on a network called a cloud service without installing software on an information processing apparatus such as a PC. An example of such a cloud service is a cloud storage that allows creating, editing, viewing and sharing electronic documents on a network. In addition, some cloud storages allow viewing of editing history, restoration of arbitrary editions, extraction of differences between arbitrary editions, and the like.

Files managed on the cloud can be viewed or edited regardless of a location where a user works and a type of terminal apparatus used for the work, as long as the cloud storage can be accessed via the network. Such features make it possible for a file managed on the cloud to be shared in real time with, for example, another user located at a remote location.

On the other hand, even in recent years, confirmation and revision of the contents of an electronic document are often performed based on a printed matter obtained by the content of the electronic document on a recording medium such as paper. In such a situation in recent years, various printers and MFPs (MultiFunction Peripherals) capable of printing electronic documents managed in the cloud storage in cooperation with the cloud storage have been proposed. For example, Japanese Patent Laid-Open No. 2017-76244 discloses an example of an image processing apparatus capable of printing an electronic document managed in a cloud storage.

In a situation in which the content of an electronic document is printed and the content is refined, reviewed, or revised by handwriting, an example of a method of reflecting the result of the refinement, the review, or the revision to the electronic document is to directly edit the electronic document on the cloud storage. However, in this method, the handwritten content is transcribed manually to the electronic document using a keyboard or the like, which may need a complicated work.

By using a scan function of a scanner or an MFP, it is possible to capture the refined or revised printed matter as electronic data. However, in this case, since the result of reading the printed matter is captured in the form of image data, it is difficult to automatically reflect the result of the refinement or the revision made on the printed matter to the electronic document in the text format.

SUMMARY

The present disclosure provides an information processing apparatus including at least one memory that stores instructions, and at least one processor that executes the instructions to perform generating a difference image based on a first image corresponding to a result of reading a printed matter and an electronic document which is a source from which the printed matter is generated, based on the difference image, identifying an instruction relating to a revision additionally written on the printed matter and a character string to be subjected to the revision in the electronic document, and performing a particular process on the electronic document based on the instruction relating to the revision and the character string to be subjected to the revision.

Further features of the present disclosure will become apparent from the following description of exemplary embodiments with reference to the attached drawings.

DESCRIPTION OF THE EMBODIMENTS

Figure 1:
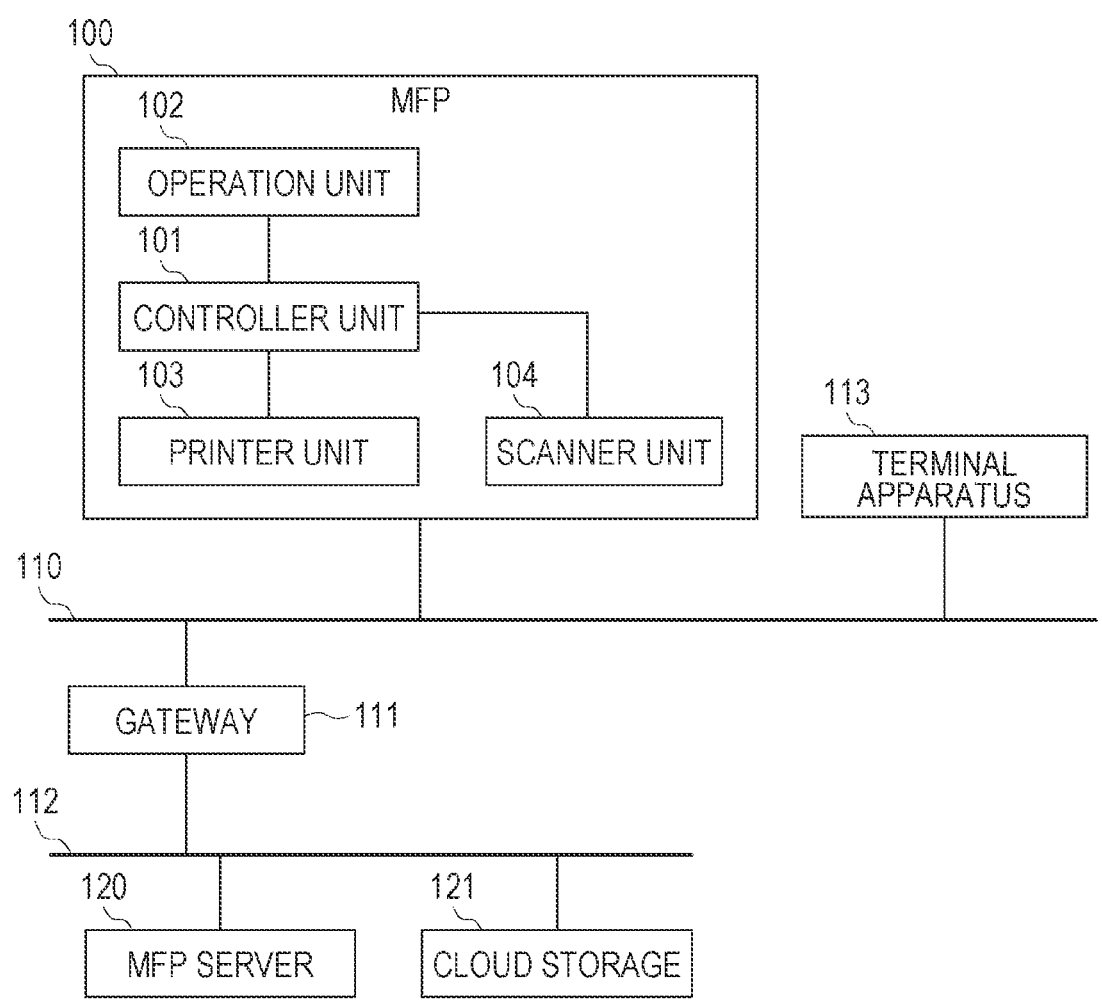
FIG. 1 is diagram illustrating an example of a system configuration of an information processing system.

Embodiments of the present disclosure are described in detail below with reference to the drawings. In the description and drawings, constituent elements that are substantially identical in functional configuration are denoted by the same reference numerals, and redundant descriptions thereof are omitted.

First Embodiment

An example of a system configuration of an information processing system according to a first embodiment is described below with reference to FIG. 1. The information processing system according to the first embodiment includes an MFP 100, a terminal apparatus 113, an MFP server 120, and a cloud storage 121. The MFP 100, the terminal apparatus 113, the MFP server 120, and the cloud storage 121 are connected to each other via a particular network.

In the specific example shown in FIG. 1, the MFP 100 and the terminal apparatus 113 are connected to each other via a LAN 110. The MFP 120 and the cloud storage 121 are connected to the Internet 112. In this situation, a communication via the LAN 110 and a communication via the Internet 112 are mediated by the gateway 111. This makes it possible for the MFP 100 and the terminal apparatus 113 connected to the LAN 110 to access the MFP server 120 or the cloud storage 121.

Note that the configuration shown in FIG. 1 is merely an example, and the network configuration is not limited to this example as long as the MFP 100, the terminal apparatus 113, the MFP server 120, and the cloud storage 121 are allowed to be connected to each other. The network that connects the various components described above such as the LAN 110, the Internet 112, etc., may include a plurality of networks, wherein the plurality of networks may be different in type from each other.

The MFP 100 includes a controller unit 101, an operation unit 102, a printer unit 103, and a scanner unit 104.

The operation unit 102, schematically shown in FIG. 1, is an interface for receiving an instruction to the MFP 100 from a user and presenting various kinds of information to the user.

The printer unit 103 prints an image corresponding to electronic data (for example, an electronic document or the like) on a recording medium such as paper (hereinafter, also referred to as a "sheet"), and outputs a resultant printed matter obtained by printing the image on the recording medium to a particular output destination.

The scanner unit 104 reads a printed matter and converts the reading result (in other words, a result obtained by optically reading the printed matter) into an image signal thereby generating image data.

The controller unit 101 is connected to the operation unit 102, the printer unit 103, and the scanner unit 104, and controls operations of these units. Thus, various functions of the MFP 100 (that is, functions of a multifunction apparatus) are realized.

The terminal apparatus 113, schematically shown in FIG. 1, is a print client that sends a print instruction to the MFP 100 by using a print protocol such as an LPR (Line Printer Remote) protocol. The terminal apparatus 113 may provide a user interface such as a Web browser for accessing an apparatus (for example, the MFP server 120, the cloud storage 121, etc.) via a network thereby allowing the user to operate this apparatus. The terminal apparatus 113 may be realized by, for example, a PC (Personal Computer) or the like.

The gateway 111 corresponds to a so-called network router used to mediate communication (in other words, transfer communication) between a plurality of devices connected to different networks.

The MFP server 120 is a server that executes various processes that provide improved functionality of the MFP 100.

The cloud storage 121 is a so-called file sharing server that transmits/receives files (data) to/from the MFP 100 by using particular protocol such as the HTTP (Hyper Text Transfer Protocol).

Figure 2:
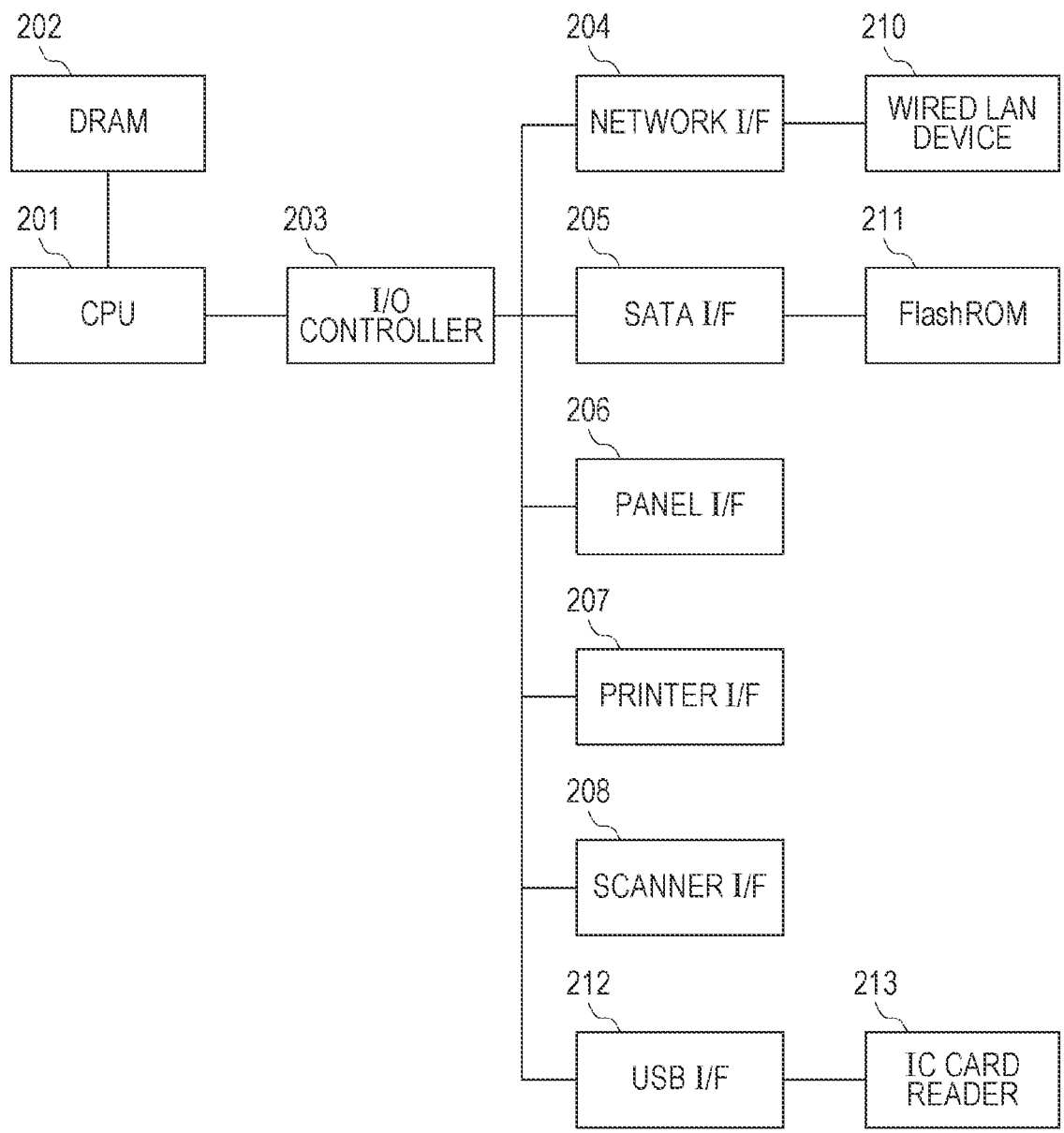
FIG. 2 is a diagram illustrating an example of a hardware configuration of an MFP.

Referring to FIG. 2, an example of a hardware configuration of the MFP 100 is described below. In the following description, a particular focus is placed on the configuration of the controller unit 101.

The controller unit 101 of the MFP 100 includes a CPU (Central Processing Unit) 201, a DRAM (Dynamic Random Access Memory) 202, and an I/O controller 203. The controller unit 101 further includes a network I/F 204, a SATA (Serial Advanced Technology Attachment) I/F 205, a panel I/F 206, a printer I/F 207, and a scanner I/F 208.

The controller unit 101 may further include a USB (Universal Serial Bus) 212.

The CPU 201 and the DRAM 202 are connected to each other via a bus. The DRAM 202 provides a work area for use by the CPU 201, in a process of executing various operations, to temporarily store program data representing operation instructions, data to be processed, and/or the like.

The CPU 201 and the I/O controller 203 are connected to each other via a bus. The I/O controller 203 controls inputting/outputting from/to various devices under the control of the CPU 201.

The SATA I/F 205 is connected to the I/O controller 203, and a storage apparatus such as a FlashROM 211 is connected to the SATA IF 205. The FlashROM 211 stores various data such as programs for the CPU 201 to realize the functions of the MFP 100, and other data such as document files.

The I/O controller 203 is also connected to the network I/F 204, and a communication device for realizing communication with a particular network such as a wired LAN device 210 is connected to the network I/F 204. The CPU 201 realizes a communication with another apparatus via a network such as the LAN 110 by controlling a communication device such as the wired LAN device 210 via the network IF 204.

Furthermore, the panel I/F 206 is connected to the I/O controller 203. By controlling the operation of the operation unit 102 via the panel I/F 206, the CPU 201 receives an instruction from a user via the operation unit 102 and presents various kinds of information to the user via the operation unit 102.

Furthermore, the printer I/F 207 is connected to the I/O controller 203. The CPU 201 controls the operation of the printer unit 103 via the printer I/F 207 to print an image on a recording medium (a sheet) such as paper and output the printed matter to a particular paper output destination.

The I/O controller 203 is also connected to the scanner I/F 208. By controlling the operation of the scanner unit 104 via the scanner/F 208, the CPU 201 realizes a process of reading a document (a printed matter) and converting the reading result into an image signal thereby generating image data.

The I/O controller 203 may also be connected to the USB LF 212. The CPU 201 controls the operation of various devices connected to the USB I/F 212 via the USB I/F 212. An IC card reader 213 is an example of a device connected to the USB I/F 212. In this case, the CPU 201 controls the operation of the IC card reader 213 via the USB I/F 212 to realize, for example, a process related to user authentication using the IC card.

The CPU 201 executes processes related to the realization of various functions of the MFP 100 by controlling the operations of various devices as described above by way of example. An example of a control operation is described below for a case where a copy function is realized.

The CPU 201 reads particular program data from the FlashROM 211 via the SATA I/F 205 and loads it in the DRAM 202. By controlling the operation of the operation unit 102 via the panel I/F 206 according to the program loaded in the DRAM 202, the CPU 201 receives an instruction related to copying from a user via the operation unit 102.

In response to receiving the instruction related to copying, the CPU 201 causes the scanner unit 104 to read a document by controlling the operation of the scanner unit 104 via the scanner I/F 208 thereby acquiring image data (electronic data) corresponding to the result of the reading. The CPU 201 performs control such that the acquired image data is stored in a particular storage area (for example, the DRAM 202).

The CPU 201 transfers the image data stored in the particular storage area to the printer unit 103 via the printer I/F 207, and instructs the printer unit 103 to execute a process related to printing based on the image data. In response to receiving this instruction, the printer unit 103 prints an image according to the above-described image data on a recording medium (a sheet) such as paper, and outputs a printed matter obtained as a result of the printing to a particular output destination.

Figure 3:
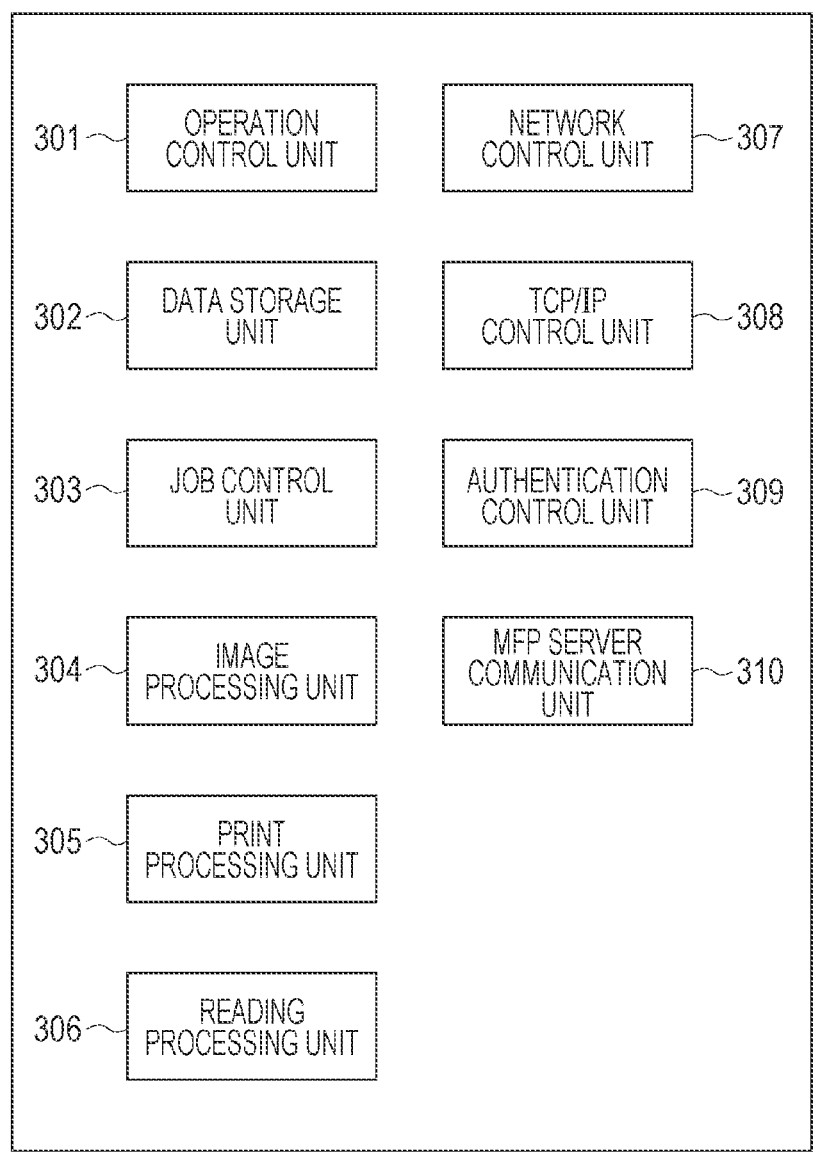
FIG. 3 is a diagram illustrating an example of a software configuration of an MFP.
Figure 4:
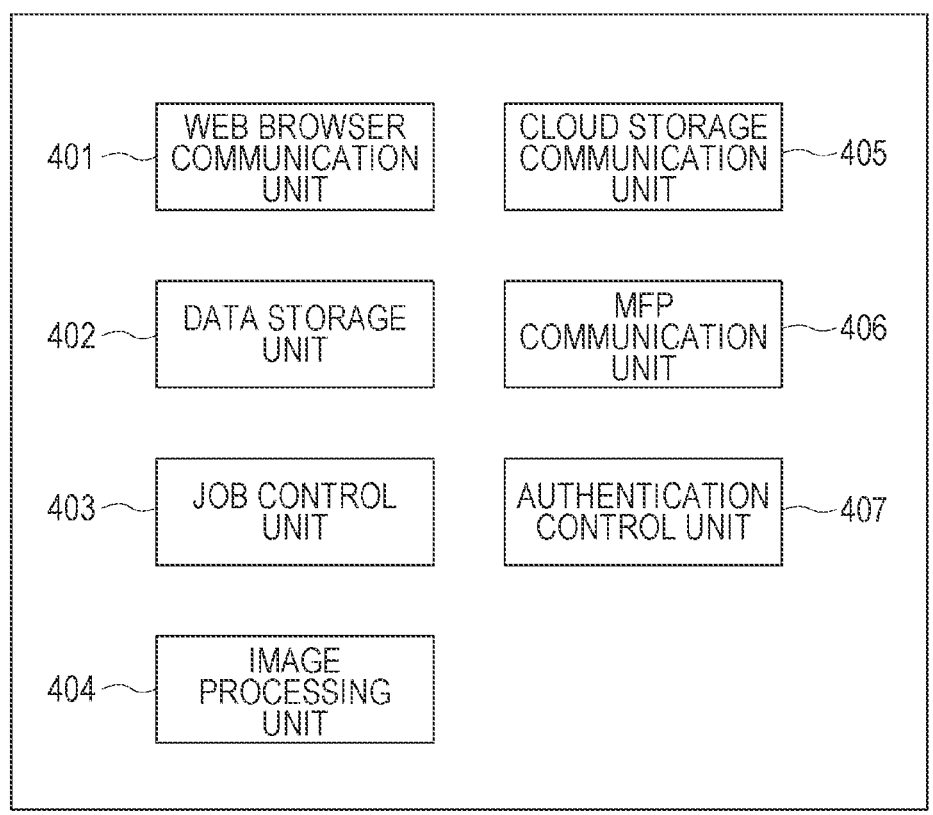
FIG. 4 is a diagram illustrating an example of a software configuration of an MFP server.

An example of a software configuration of an information processing system according to the first embodiment is described below with reference to FIGS. 3 and 4, with a particular focus on the MFP 100 and the MFP server 120.

Software Configuration of MFP 100

First, an example of a software configuration of the MFP 100 is described with reference to FIG. 3.

As constituent elements for realizing the functions of the MFP 100, the MFP 100 includes, for example, an operation control unit 301, a data storage unit 302, a job control unit 303, an image processing unit 304, a print processing unit 305, and a reading processing unit 306. Furthermore, as constituent elements for realizing the functions of the MFP 100, the MFP 100 also includes a network control unit 307, a TCP/IP control unit 308, an authentication control unit 309, and an MFP server communication unit 310. A process performed by each constituent element shown in FIG. 3 is realized, for example, by the CPU 201 by loading a program stored in the storage area such as the Flash ROM 211 into a work area such as the DRAM 202 and executing the program.

The operation control unit 301 performs control such that a screen image for accepting an instruction from a user and presenting various kinds of information to the user is displayed on the operation unit 102 and further performs control such that an operation performed by the user on the screen image is detected and a process corresponding to a button or the like displayed on the screen is executed.

The data storage unit 302 executes a process related to storing various data in a storage area such as the FlashROM 211 and reading various data from the storage area. A specific example is described below for a case where a user issues, via the operation unit 102, an instruction to change the device setting related to the operation of the MFP 100. In this case, the operation control unit 301 recognizes the content of the instruction from the user received via the operation unit 102, and requests the data storage unit 302 to store a device set value according to the content of the instruction. In response to receiving the request from the operation control unit 301, the data storage unit 302 stores the set value according to the content of the instruction given by the user in a particular storage area (for example, FlashROM 211 or the like) as the device set value.

The job control unit 303 performs various controls related to job execution.

The image processing unit 304 processes the image data into data in a specific format (for example, data in a suitable format depending on usage) according to the instruction from the job control unit 303.

The print processing unit 305 controls the operation of the printer unit 103 via the printer I/F 207 in accordance with an instruction from the job control unit 303 to print an image on a recording medium (a sheet) such as paper, and outputs a resultant printed matter to a particular output destination.

The reading processing unit 306 controls the operation of the scanner unit 104 via the scanner I/F 208 in accordance with an instruction given by the job control unit 303 to perform various processes related to reading a document placed on a reading plate of the scanner unit 104.

According to the set value stored in the particular storage area, the network control unit 307 controls network setting such as setting of an IP address in response to a particular trigger such as when the system is started or when a setting change is detected. That is, the settings related to the operation of the constituent elements related to communication such as the TCP/IP control unit 308 are controlled.

The TCP/IP control unit 308 executes various processes for sending and receiving network packets to and from other apparatuses through the network to which the MFP 100 is connected via the network/F 204.

The authentication control unit 309 executes a process related to user authentication based on a particular authentication method. For example, the authentication control unit 309 compares information read from the IC card via the IC card reader 213 with data related to a user stored in a particular storage area of the data storage unit 302, and, according to a comparison result, the authentication control unit 309 performs authentication of the user who wants to use the MFP 100.

The MFP server communication unit 310 performs control to cause the network control unit 307 to control the communication with the MFP server 120 according to an instruction given by the job control unit 303.

An example of an operation of each constituent element is described below for a case where a copy function is realized.

For example, when the operation control unit 301 receives an instruction from a user to start copying, the operation control unit 301 instructs the job control unit 303 to start a process related to the realization of the copy function. The job control unit 303 instructs the reading processing unit 306 to read a document, and acquires image data generated based on an image signal output as a result of the reading. In the following description, for convenience, an image obtained as a result of reading a document is also referred to as a "scanned image".

The job control unit 303 instructs the image processing unit 304 to convert the acquired image data into data in a format suitable for printing the scanned image.

The job control unit 303 then instructs the print processing unit 305 to perform printing based on the resultant image data which has been converted into the suitable format by the image processing unit 304. In response to this instruction, the print processing unit 305 instructs the printer unit 103 to execute a process related to printing based on the image data specified by the job control unit 303. Thus, the document is copied and a resultant printed matter is output.

Next, referring to FIG. 4, an example of a software configuration of the MFP server 120 is described below.

The MFP server 120 includes, as constituent elements for realizing the functions of the MFP server 120, for example, a Web browser communication unit 401, a data storage unit 402, a job control unit 403, an image processing unit 404, a cloud storage communication unit 405, an MFP communication unit 406, and an authentication control unit 407.

A series of software programs executed by the MFP server 120 may be stored, for example, as distributed resources on the cloud. In this case, after the programs are written in nonvolatile memories allocated as the distributed resources, they may be executed by calculation resources allocated to the distributed resources, thereby realizing the processing of each software.

The Web browser communication unit 401 executes a process related to presenting various kinds of information to a user and receiving instructions from the user in response to a request from a Web browser operating on another apparatus (for example, the terminal apparatus 113). The Web browser communication unit 401 also controls the execution of processes associated with respective components such as a button on the screen presented to a user via the Web browser.

The data storage unit 402 executes a process related to storing various data in a storage area such as a distributed resource on the cloud and reading various data from the storage area. A specific example is described below for a case where an instruction is issued, via the Web browser, to change a device setting related to the operation of the MFP server 120. In this case, the Web browser communication unit 401 recognizes the content of the instruction received from the user via the Web browser, and requests the data storage unit 402 to store a device set value according to the content of the instruction. In response to receiving the request from the Web browser communication unit 401, the data storage unit 402 stores the device set value in a particular storage area (for example, a distributed resource on the cloud) according to the content of the instruction given by the user.

The job control unit 403 performs various controls related to job execution.

The image processing unit 404 processes the image data into data in a specific format (for example, data in a suitable format depending on usage) according to the instruction from the job control unit 403.

The cloud storage communication unit 405 controls communication with the cloud storage 121 by using the user account information stored in the particular storage area by the data storage unit 402.

The MFP communication unit 406 executes various processes related to communication with the MFP 100. In a specific example, the MFP communication unit 406 may execute processes related to accepting a request transmitted from the MFP 100, notifying the MFP 100 of various kinds of information, and/or the like.

The authentication control unit 407 executes a process related to user authentication based on a particular authentication method. For example, the authentication control unit 407 may perform authentication of a user who uses the MFP server 120 by comparing the authentication information accepted by the Web browser communication unit 401 with data related to the user stored in a particular storage area by the data storage unit 402.

Example of user interfaces of the information processing system according to the first embodiment are described below with reference to FIGS. 5 to 11.

Menu Screen

Figure 5:
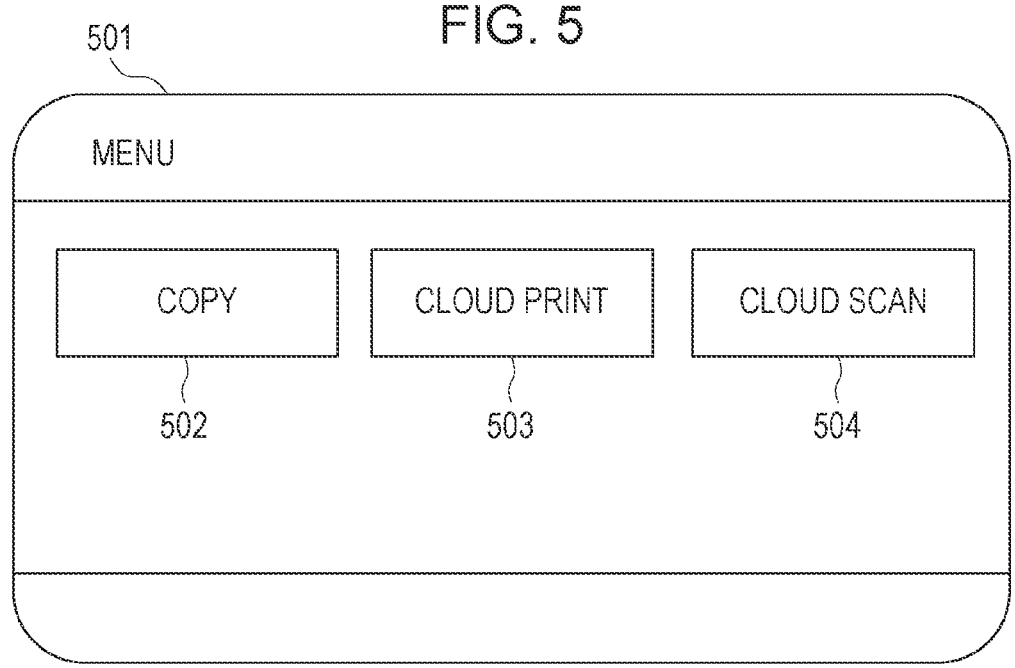
FIG. 5 is a diagram illustrating an example of a menu screen.

First, a menu screen is described referring to FIG. 5. FIG. 5 is a diagram illustrating an example of a menu screen 501 displayed on the operation unit 102 of the MFP 100. The menu screen 501 is a screen for receiving instructions from a user regarding the execution of various functions of the MFP 100. When the TC card reader 213 recognizes an TC card presented by a user, the authentication control unit 309 authenticates the user based on information read from the IC card. When the authentication is successful, the menu screen 501 is displayed.

A button 502 is a user interface for accepting an instruction related to the execution of the copy function from a user.

A button 503 is a user interface for accepting, from a user, an instruction related to the execution of a print function using data (for example, an electronic document) stored in the cloud storage 121 (hereinafter, also referred to as a "cloud print function").

A button 504 is a user interface for accepting from a user an instruction related to the execution of reading a document and storing data obtained as a result of reading the document in the cloud storage 121 (hereinafter also referred to as a "cloud scan function").

Cloud Print Screen

Figure 6:
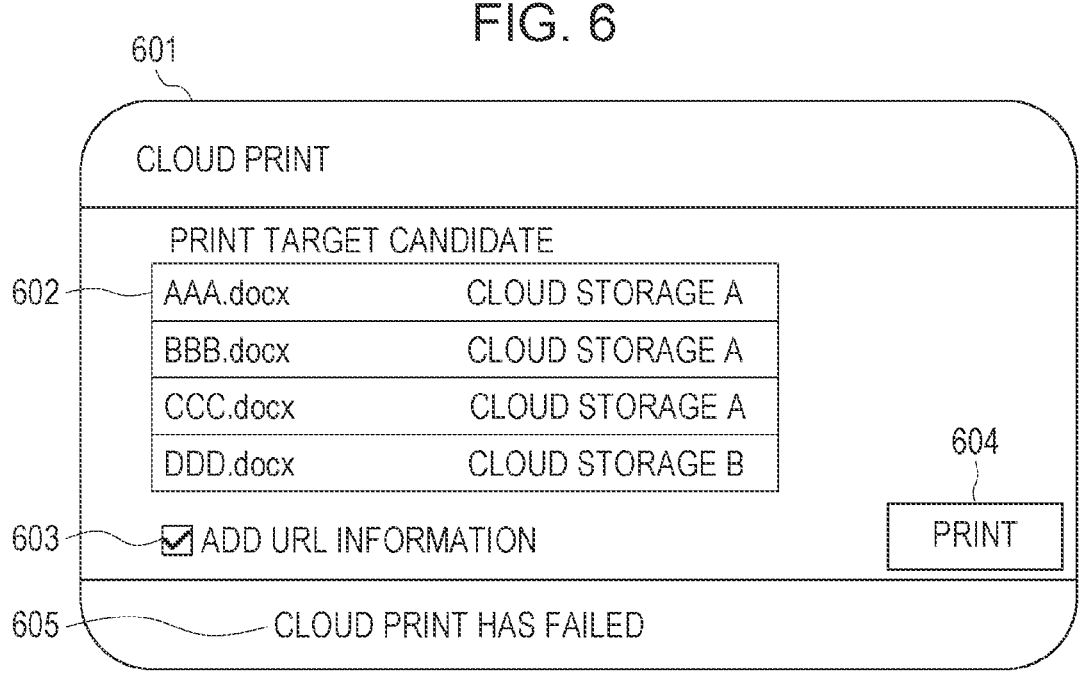
FIG. 6 is a diagram illustrating an example of a cloud print screen.

Next, FIG. 6 is referred to. FIG. 6 is a diagram illustrating an example of a cloud print screen 601 displayed on the operation unit 102 of the MFP 100. The cloud print screen 601 is a screen for receiving instructions from a user regarding various settings of the print function (the cloud print function) using data stored in the cloud storage 121. The cloud print screen 601 is displayed on the operation unit 102, for example, when the button 503 is pressed on the menu screen 501.

A display area 602 is an area in which a list of files that can be printed by the cloud printing (in other words, a list of candidates for a print target file). The list of files displayed in the display area 602 may be scrollable, for example, by a scroll bar. When a file is selected from the displayed list, the file is set as a print target file to be printed by the cloud printing.

The candidates for a print target file displayed in the display area 602 may be limited to files associated with account information of a user identified by the authentication.

In a case where a plurality of cloud storages are used as the cloud storage 121, for example, files stored in each of the plurality of cloud storages may be displayed together in a single list in the display area 602. In this case, information about the cloud storage (for example, information indicating a cloud storage name or the like) in which each file is stored may be displayed in association with the file.

A check box 603 is a user interface for accepting an instruction from a user as to whether or not information indicating a path to a file selected as the print target is to be associated with the file (hereinafter, the information indicating the path will also be referred to as "URL information"). By associating each file with corresponding URL information, for example, it becomes possible for other apparatuses such as the MFP 100 to identify, based on the URL information, a file (a source file from which a received file has been copied) managed by the cloud storage 121.

A button 604 is a user interface for accepting, from a user, an instruction related to the execution of the cloud print function according to the instructions specified by the user via the display area 602 and via the check box 603. When the button 604 is pressed, the information corresponding to the instructions received from the user via the display area 602 and the check box 603 is transmitted to the MFP server 120, and the MFP server 120 is instructed to execute various processes related to the realization of the cloud print function.

A display area 605 is an area in which notification information (for example, a message or the like) for notifying a user of various situations is displayed. In a specific example, when an error occurs and the execution of a printing process is interrupted, information about the error may be displayed in the display area 605 to notify the user of the situation.

Figure 7:
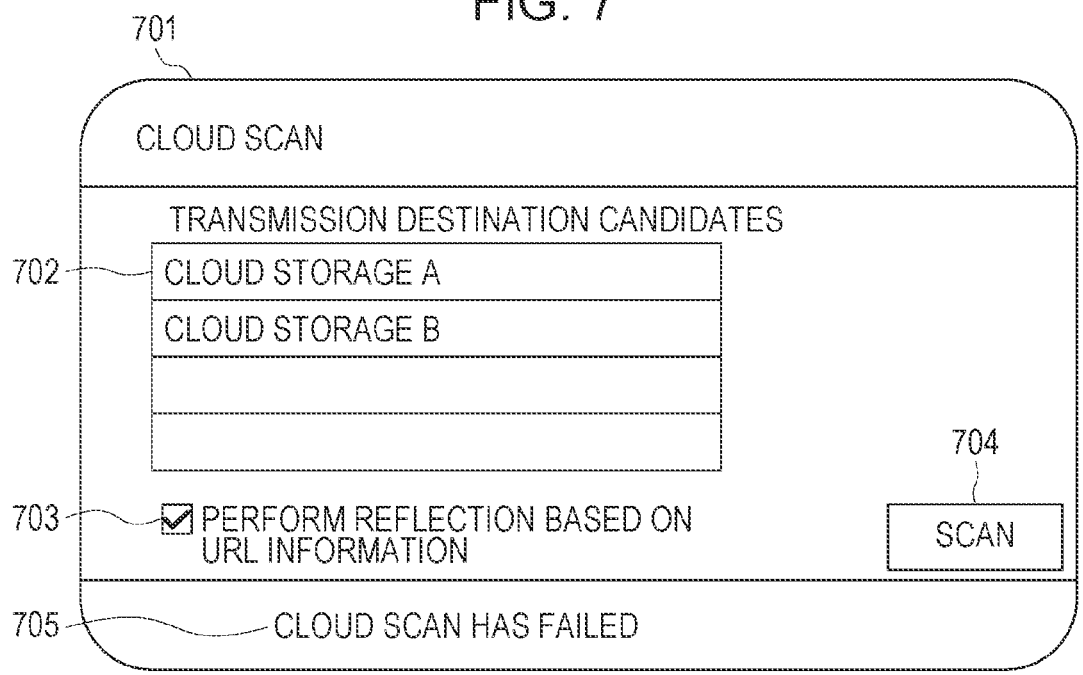
FIG. 7 is a diagram illustrating an example of a cloud scan screen.

Next, FIG. 7 is referred to. FIG. 7 is a diagram illustrating an example of a cloud scan screen 701 displayed on the operation unit 102 of the MFP 100. The cloud scan screen 701 is a screen for accepting an instruction from a user regarding various settings of a function (a cloud scan function) of reading a document and storing data obtained as a result of the reading in the cloud storage 121. The cloud scan screen 701 is displayed on the operation unit 102, for example, when the button 504 is pressed on the menu screen 501.

A display area 702 is an area in which a list of cloud storages that are available as destinations to which a file (for example, a scanned image file) obtained as a result of the reading can be transmitted. The list of cloud storages displayed in the display area 702 may be scrollable, for example, by a scroll bar. When one of cloud storages displayed in the list is selected, the selected cloud storage is set as the destination to which the file obtained as a result of the reading is to be transmitted.

The list of cloud storages displayed in the display area 702 may be a list of cloud storages available for a user identified by authentication. In this case, the MFP 100 may refer to information indicting cloud storages available for each user registered in the MFP server 120, and the MFP 100 may determine a list of cloud storages available for the user according to the information.

A check box 703 is a user interface for accepting an instruction from a user as to whether or not the URL information associated with a file selected as a print target is to be used in executing a process according to a result of the scanning. In a case where the check box 703 is checked, for example, based on the above-described URL information, a cloud storage is identified to which a file obtained as a result of reading a document is to be transmitted, and the result of the scanning is reflected to the print source file.

A button 704 is a user interface for accepting an instruction related to the execution of the cloud scan function from the user according to the instructions given by the user via the display area 702 and the check box 703. When the button 704 is pressed, a document is read under the control of the reading processing unit 306, and data (a file) obtained as a result of the reading is transmitted to the MFP server 120. In this transmission process, information related to the instructions given by the user via the display area 702 and the check box 703 is also transmitted, in association with the data obtained as a result of the reading, to the MFP server 120.

A display area 705 is an area in which notification information (for example, a message or the like) for notifying the user of various situations is displayed. In a specific example, when an error occurs and the execution of a process related to reading of a document is interrupted, information about the error may be displayed in the display area 705 to notify the user of the situation.

Figure 8:
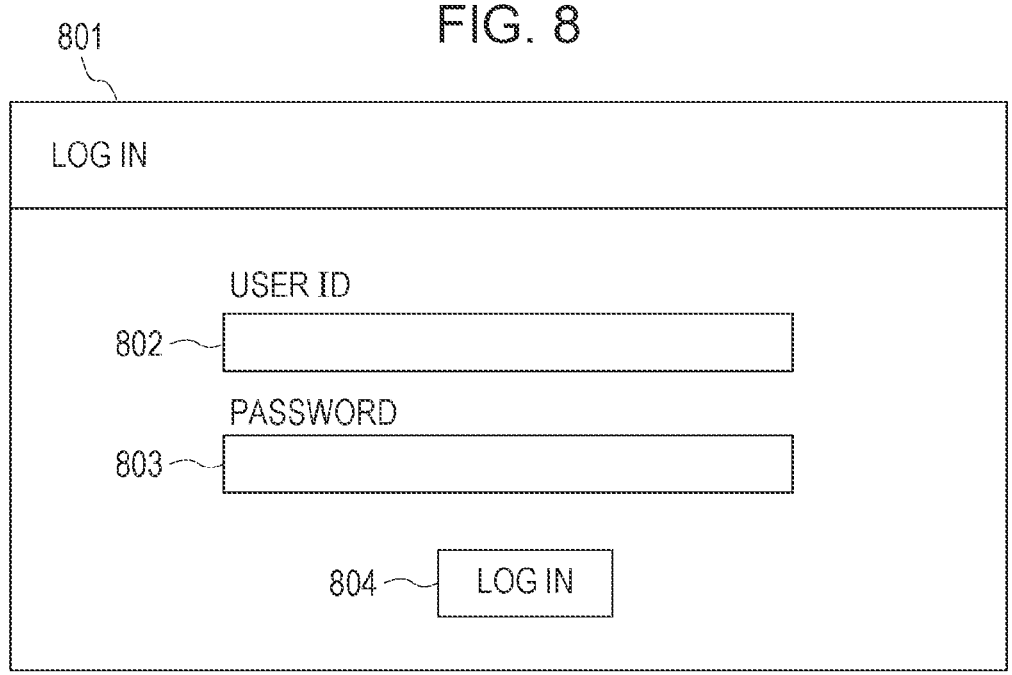
FIG. 8 is a diagram illustrating an example of a login screen.

Next, FIG. 8 is referred to. FIG. 8 is a diagram illustrating an example of a login screen 801 that is displayed on a display unit (for example, a browser screen or the like) of another apparatus (for example, a terminal apparatus 113) in response to an instruction issued by the MFP server 120 via a network. The login screen 801 is a screen for accepting information input by a user, which is to be used for user authentication by the MFP server 120. For example, the login screen 801 is displayed on a display unit of an information processing apparatus having a communication function such as the terminal apparatus 113 when a user who is not yet authenticated tries to access the MFP server 120 via the information processing apparatus.

Each of the input areas 802 and 803 is a user interface for accepting information, for use in user authentication, input by a user when the user tries to log in to the MFP server 120. More specifically, in the example shown in FIG. 8, the input area 802 is an area for accepting an input, by a user, of identification information (a user ID) identifying the user. The input area 803 is an area for accepting an input, by the user, of a user authentication password corresponding to the identification information input via the input area 802.

A button 804 is a user interface for accepting an instruction related to login to the MFP server 120 from a user. When the button 804 is pressed, the information input via the input area 802 and the information input via the input area 803 are transmitted to the MFP server 120, and the MFP server 120 is requested to authenticate the user based on the information. In response to this request, the authentication control unit 407 of the MFP server 120 performs authentication by determining whether information transmitted together with this request is consistent with account information of the user stored in a particular storage area of the data storage unit 402. In a case where the authentication of the user is passed successfully, the MFP server 120 allows the user to access the MFP server 120.

Figure 9:
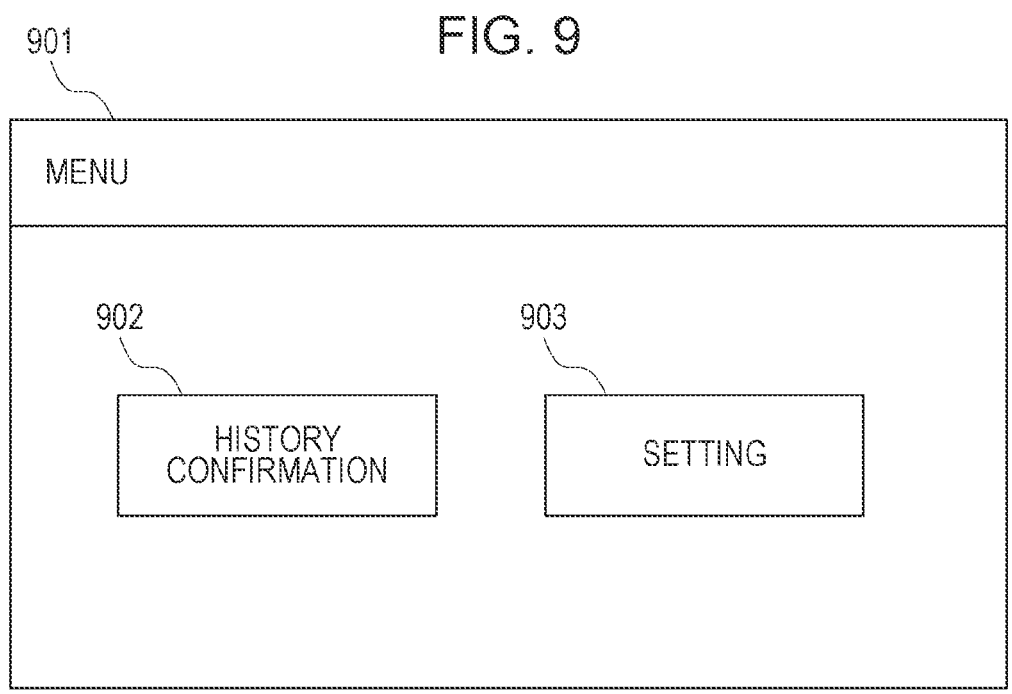
FIG. 9 is a diagram illustrating an example of a menu screen.

Next, FIG. 9 is referred to. FIG. 9 is a diagram illustrating an example of a menu screen 901 that is displayed on a display unit (for example, a browser screen or the like) of another apparatus (for example, the terminal apparatus 113) in response to an instruction issued by the MFP server 120 via a network. The menu screen 901 is a screen for receiving various instructions related to using the MFP server 120 from a user. The menu screen 901 is displayed on a display unit of an information processing apparatus (for example, the terminal apparatus 113) when authentication of the user is performed based on the information input via the login screen 801 shown in FIG. 8 and the authentication is successful.

A button 902 is a user interface for accepting an instruction from a user regarding displaying a screen for viewing the history of processes, such as the cloud scan process, performed in cooperation with the MFP server 120. An example of this screen will be described later with reference to FIG. 10.

A button 903 is a user interface for accepting from a user an instruction to display a screen that allows the user to specify various settings related to processes, such as the cloud scan process, performed in cooperation with the MFP server 120. An example of this screen will be described later with reference to FIG. 11.

Figure 10:
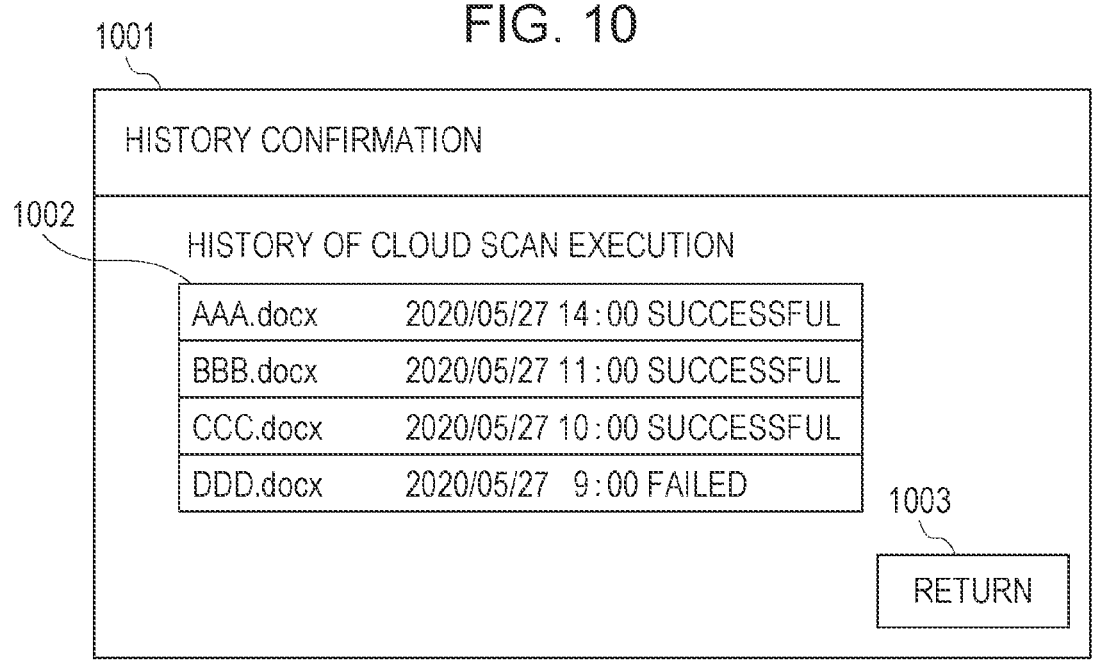
FIG. 10 is a diagram illustrating an example of a history confirmation screen.

Next, FIG. 10 is referred to. FIG. 10 is a diagram illustrating an example of a history confirmation screen 1001 that is displayed on a display unit (for example, a browser screen or the like) of another apparatus (for example, the terminal apparatus 113) in response to a request issued by the MFP server 120 via a network. The history confirmation screen 1001 is a screen for confirming a history of processes such as the cloud scan process performed in cooperation with the MFP server 120. In the present embodiment, it is assumed by way of example that the history confirmation screen 1001 is used for confirming the history related to the execution of the cloud scan. For example, the history confirmation screen 1001 is displayed on a display unit of an information processing apparatus (for example, the terminal apparatus 113) when the button 902 is pressed on the menu screen 901 shown in FIG. 9.

A display area 1002 is an area in which the history related to the execution of the cloud scan is displayed. Examples of the history information include information related to a target file, information related to the date and time of execution, information related to whether or not the process related to storing in the cloud storage is successful, etc., wherein the history information is displayed for each cloud scan process executed.

As described above, when an error occurs in the MFP 100, information about the error is displayed in the display area 705 of the cloud scan screen 701 displayed on the operation unit 102 of the MFP 100. On the other hand, when an error occurs in the MFP server 120, information about the error is displayed in the display area 1002 of the history confirmation screen 1001. Such a configuration makes it unnecessary to occupy the MFP 100 after the process executed by the MFP 100 is completed, and thus it becomes possible thereafter to allow other users to use the MFP 100 for other purposes.

A button 1003 is a user interface for accepting, from a user, an instruction to return the screen to a previous screen (for example, the menu screen 901) from which the history confirmation screen 1001 has been called. When the button 1003 is pressed, the previous screen, from which the history confirmation screen 1001 has been called, is displayed again.

Figure 11:
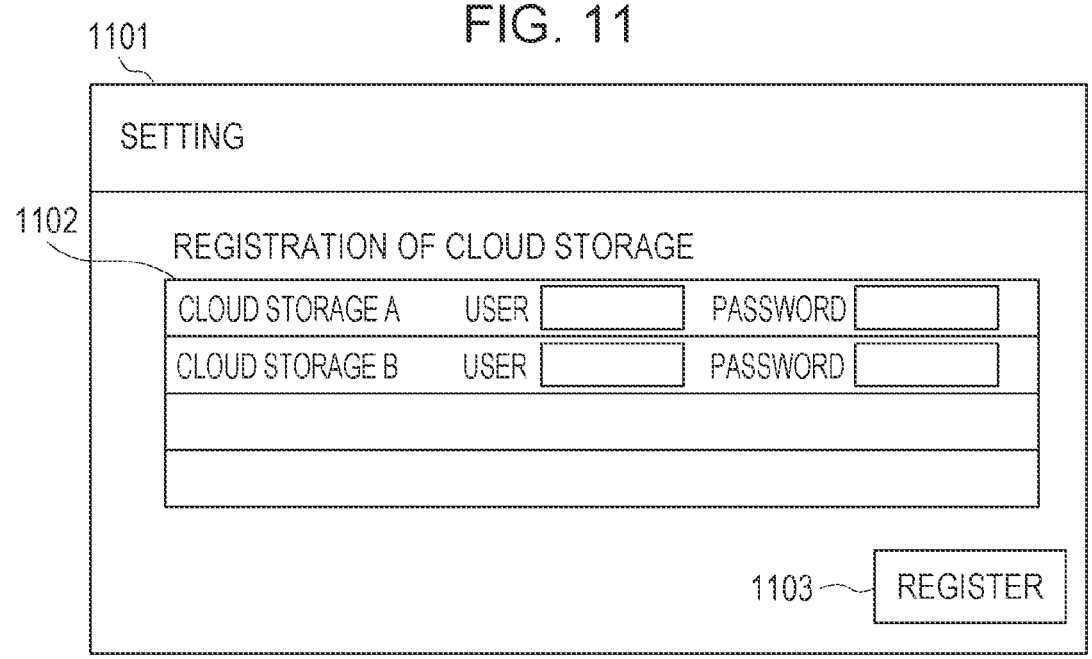
FIG. 11 is a diagram illustrating an example of a setting screen.

Next, FIG. 11 is referred to. FIG. 11 is a diagram illustrating an example of a setting screen 1101 that is displayed on a display unit (for example, a browser screen or the like) of another apparatus (for example, the terminal apparatus 113) in response to a request issued by the MFP server 120 via a network. The setting screen 1101 allows a user to specify various settings related to processes, such as the cloud scan process, performed in cooperation with the MFP server 120. In the present embodiment, the setting screen 1101 is used, by way of example, to specify settings related to the cloud storage used for storing files obtained as a result of reading documents in executing the cloud scan. The setting screen 1101 is displayed on a display unit of an information processing apparatus (for example, the terminal apparatus 113), for example, when the button 903 is pressed on the menu screen 901 shown in FIG. 9.

The setting area 1102 is a user interface for accepting, from a user, information related to an account used for accessing the cloud storage in executing the cloud scan. In the example shown in FIG. 11, the setting area 1102 includes an area for accepting specifying a user ID used in accessing the cloud storage and an area for accepting a corresponding password used in authentication of the user.

A button 1003 is a user interface for accepting an instruction from a user regarding the application of the information specified in the setting area 1102. When the button 1003 is pressed, information specified in the setting area 1102 is stored by the data storage unit 402 into a particular storage area. The information stored in the storage area is used for authentication of a user when the MFP server 120 accesses the cloud storage 121.

Figure 12:
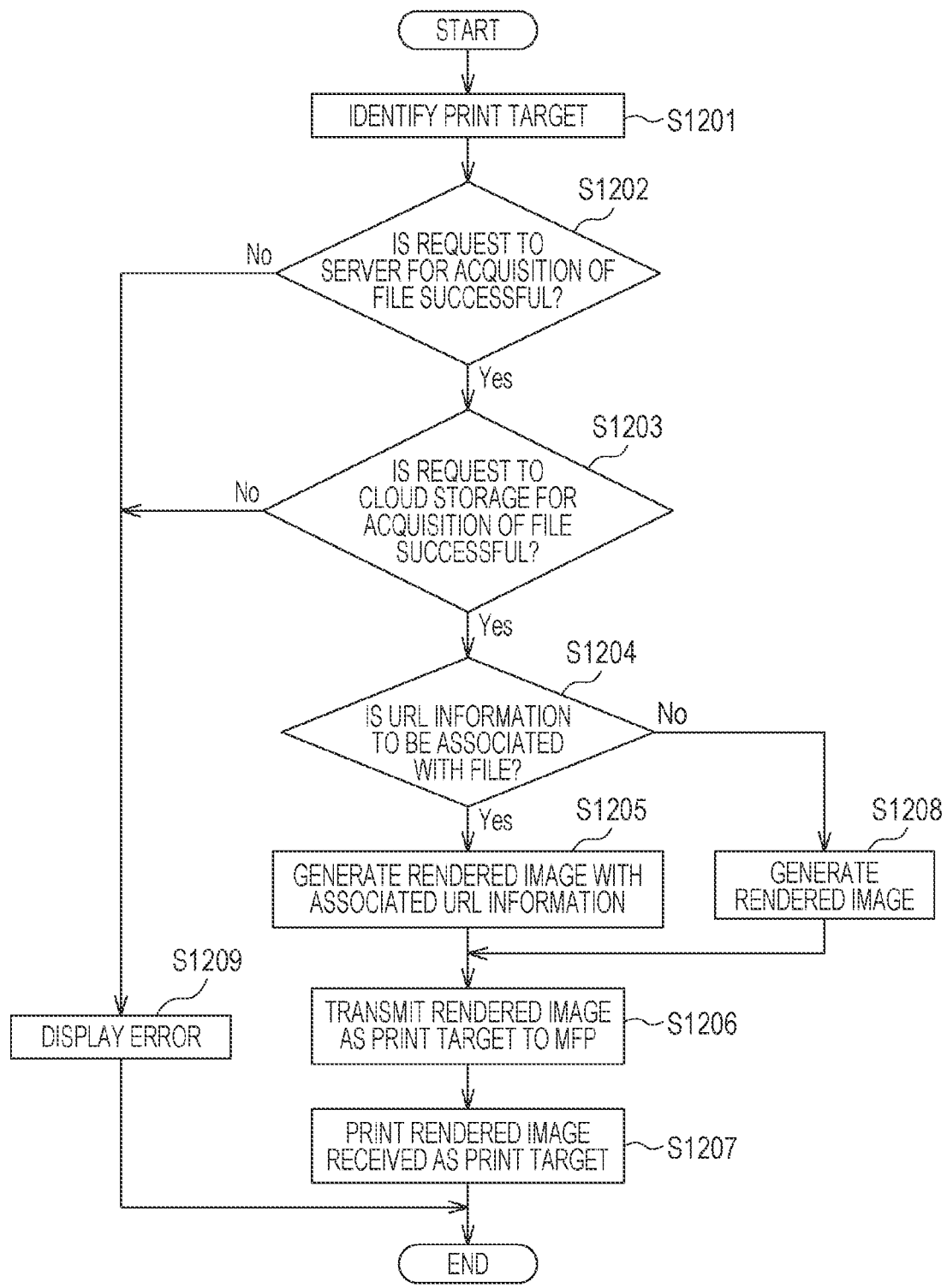
FIG. 12 is a flowchart illustrating an example of a printing process according to one or more aspects of the present disclosure.

An example of a process performed by the information processing system according to the first embodiment is described below with reference to FIGS. 12 and 13.

First, an example of a process related to the realization of the cloud print function is described with reference to FIG. 12. The series of processing steps shown in FIG. 12 is started, for example, when the button 604 is pressed on the cloud print screen 601 shown in FIG. 6.

In S1201, the operation control unit 301 identifies a file specified as a print target by a user based on the selection of a file from the list displayed in the display area 602 of the cloud print screen 601. The operation control unit 301 notifies the MFP server communication unit 310 of the file specified as the print target and the check state of the check box 603, and requests the MFP server communication unit 310 to perform processing related to the realization of the cloud print function.

In S1202, the MFP server communication unit 310 transmits the information about the file specified in S1201 and the information related to the check state of the check box 603 to the MFP server 120. As described above, the MFP server communication unit 310 requests the MFP server 120 to acquire the specified file, and instructs whether URL information is to be associated with the file according to the check state of the check box 603.

The MFP server communication unit 310 then determines whether or not the above-described request has been successfully transmitted to the MFP server 120.

In a case where the MFP server communication unit 310 determines in S1202 that the transmission of the above-described request to the MFP server 120 has failed, the processing proceeds to S1209. In S1209, the operation control unit 301 of the MFP 100 performs control such that information about an occurrence of an error is displayed in the display area 605 of the cloud print screen 601. After that, the series of processing steps shown in FIG. 12 is ended.

On the other hand, in a case where the MFP server communication unit 310 determines in S1202 that the transmission of the above-described request to the MFP server 120 is successful, the processing proceeds to S1203.

In S1203, the MFP communication unit 406 receives the request transmitted in S1202 from the MFP 100, and registers the processing content corresponding to the request in the job control unit 403. The job control unit 403 requests the cloud storage communication unit 405 to perform the processing according to the registered processing content.

In response to this request, the cloud storage communication unit 405 attempts to acquire the file specified in S1202 as the acquisition target from the cloud storage 121. In this processing, the cloud storage communication unit 405 uses, in the authentication for accessing the cloud storage, the account information related to the target cloud storage stored in the particular storage area by the data storage unit 402.

The cloud storage communication unit 405 determines whether or not the acquisition of the target file is successful.

In a case where the cloud storage communication unit 405 determines in S1203 that the acquisition of the target file has failed, the processing proceeds to S1209. In S1209, the cloud storage communication unit 405 notifies the MFP 100 that the acquisition of the target file has failed. Upon receiving this notification, the operation control unit 301 of the MFP 100 performs control such that information regarding an occurrence of an error is displayed in the display area 605 of the cloud print screen 601. After that, the series of processing steps shown in FIG. 12 is ended.

On the other hand, in a case where the cloud storage communication unit 405 determines in S1203 that the acquisition of the target file is successful, the processing proceeds to S1204.

In S1204, the job control unit 403 determines whether or not to associate the URL information with the target file according to the processing content registered in S1203.

In a case where the job control unit 403 determines in S1204 that the URL information is to be associated with the target file, the processing proceeds to S1205. In S1205, the job control unit 403 requests the image processing unit 404 to create a rendered image with which URL information is associated. The image processing unit 404 creates the rendered image by performing rendering on the print target file acquired in S1203. Examples of files to be printed include an electronic document in a text format, an electronic document described in a particular markup language, and the like.

Examples of markup languages used for describing electronic documents include XML (Extensible Markup Language), HTML (Hyper Text Markup Language), and the like. Note that these are merely examples, and other markup languages may be used as long as they can be used to describe electronic documents.

An example of a file format for a rendered image is a bitmap format. However, other file formats such as a PDF (Portable Document Format) in which an arbitrary printing layout is specified may be employed.

The image processing unit 404 adds a cover page to the created rendered image, and describes, on the cover page, URL information indicating the location where the print target file is stored on the cloud storage in a particular description format. Examples of the description formats include a character string indicating the URL or a directory path to the target file, a so-called bar code format such as a two-dimensional bar code, and the like.

In a case where the job control unit 403 determines in S1204 that the URL information is not to be associated with the target file, the processing proceeds to S1208. In S1208, the job control unit 403 requests the image processing unit 404 to create a rendered image with which URL information is associated. The image processing unit 404 creates the rendered image by performing rendering on the print target file acquired in S1203. The process related to the creation of the rendered image is the same as the process in S1205.

In S1206, the job control unit 403 transmits the rendered image created in S1205 or S1208 by the image processing unit 404 to the MFP 100 via the MFP communication unit 406.

In S1207, the MFP server communication unit 310 of the MFP 100 receives the rendered image transmitted from the MFP server 120 in S1206, and registers, in the job control unit 303, a print job in which the rendered image is specified as the print target. The job control unit 303 performs control such that the print processing unit 305 executes the process related to printing the rendered image based on the registered print job.

Figure 13A:
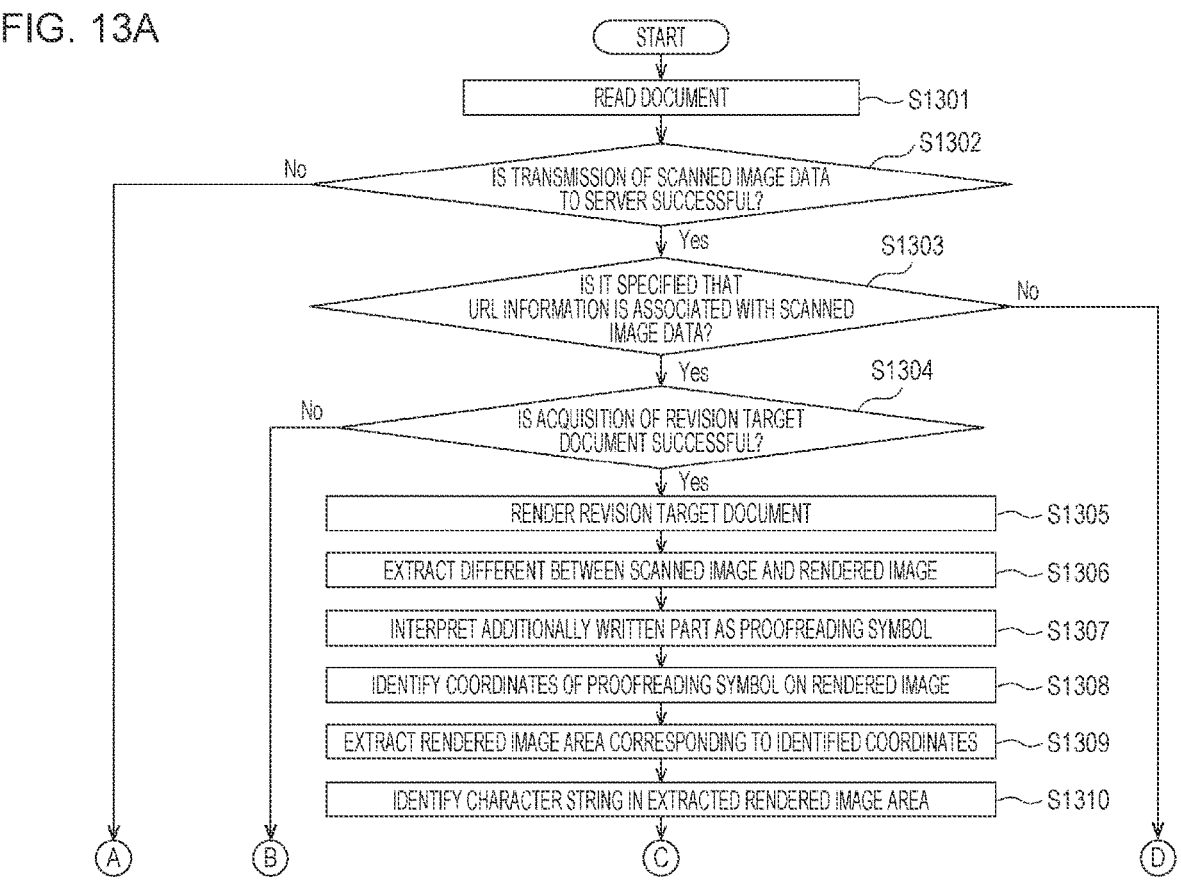
FIGS. 13A and 13B illustrate a flowchart of an example of a scanning process according to one or more aspects of the present disclosure.
Figure 13B:
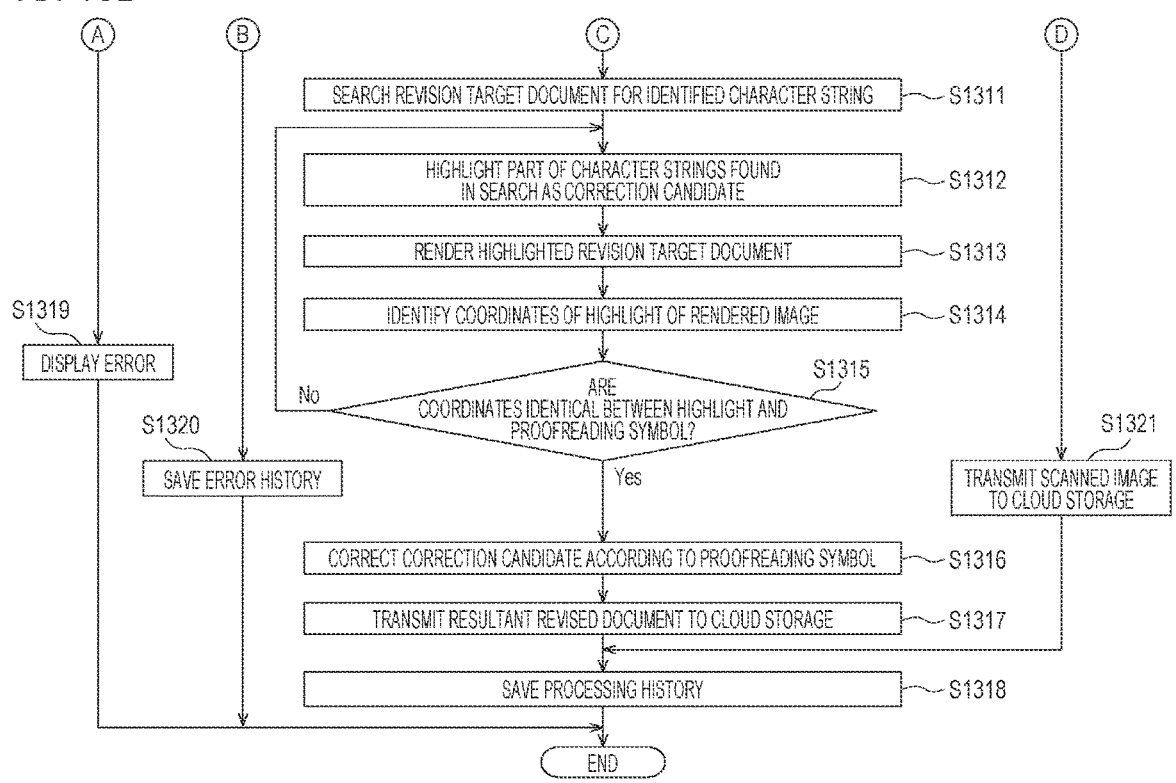

Next, an example of a process related to the realization of the cloud scan function is described below with reference to FIGS. 13A and 13B. A series of processing steps shown in FIGS. 13A and 13B is started, for example, when the button 704 is pressed on the cloud scan screen 701 shown in FIG. 7.

In S1301, the operation control unit 301 registers, in the job control unit 303, the content of the could scan process according to the selection state of the cloud storage in the display area 702 and the check state of the check box 703 on the cloud scan screen 701. The selection state of the cloud storage in the display area 702 and the check state of the check box 703 may be registered, for example, as attributes of the processing contents.

The job control unit 303 requests the reading processing unit 306 to execute a process related to reading a document placed on the scanner unit 104 according to the registered processing contents. In response to this request, the reading processing unit 306 controls the operation of the scanner unit 104 to execute the process related to reading the document placed on the reading plate of the scanner unit 104.

The scanned image obtained as a result of reading the document is output as data (a file), for example, in a bitmap format in which information obtained by optically reading the document is arranged two-dimensionally.

In S1302, the MFP server communication unit 310 transmits the data obtained as the result of reading the document in S1301 (that is, the scanned image data) to the MFP server 120 and requests the MFP server 120 to process it. In this process, the information about the cloud storage selected in the display area 702 and the information about the check state of the check box 703 are also notified to the MFP server 120.

The MFP server communication unit 310 determines whether or not the data obtained as the result of reading the document has been successfully transmitted to the MFP server 120.

In a case where the MFP server communication unit 310 determines in S1302 that the transmission of the data obtained as the result of reading the document to the MFP server 120 has failed, the processing proceeds to S1319. In S1319, the operation control unit 301 of the MFP 100 performs control such that information about an occurrence of an error is displayed in the display area 705 of the cloud scan screen 701. After that, the series of processing steps shown in FIGS. 13A and 13B is ended.

On the other hand, in a case where the MFP server communication unit 310 determines in S1302 that the transmission of the data obtained as the result of reading the document to the MFP server 120 is successful, the processing proceeds to S1303.

In S1303, the MFP communication unit 406 receives the processing request transmitted from the MFP 100, and registers the processing content corresponding to the processing request in the job control unit 403. Based on the registered information of the attribute of the processing request, the job control unit 403 determines whether the cloud storage is specified as the transmission destination to which the data obtained as the result of reading the document is to be transmitted or it is specified that the URL information is to be associated with the data obtained as the result of reading the document.

In a case where the job control unit 403 determines in S1303 that it is not specified that the URL information is to be associated with the data obtained as the result of reading the document but a cloud storage is specified as the transmission destination, the processing proceeds to S1321. In S1321, the job control unit 403 transmits the data obtained as the result of reading the document (in other words, the scanned image data) to the cloud storage specified as the transmission destination via the cloud storage communication unit 405.

In the present example, the URL information is not associated with the above-described data, which means that no file on the cloud storage is specified as a file to which a revision performed on the data is applied. Therefore, for example, the above-described data may be placed in a directory set as a default in the cloud storage specified as the transmission destination.

The file name of the data may be determined, for example, based on a rule set in the cloud storage. In a specific example, the file name of the data may be determined based on information regarding the date and time when the scanning is performed.

The file format of the data may be determined based on, for example, a rule set in the cloud storage. In a specific example, the data may be stored in a PDF format.

Note that these are merely examples, and may be modified as required.

On the other hand, in a case where the job control unit 403 determines in S1303 that it is specified that the URL information is to be associated with the data obtained as the result of reading the document, the processing proceeds to S1304.

In the present example, it is assumed by way of example that the operation control unit 301 performs control such that the selection of the cloud storage in the display area 702 and the checking of the check box 703 on the cloud scan screen 701 are exclusively enabled. More specifically, when the check box 703 is in the checked state, it is controlled such that the selection of a cloud storage in the display area 702 is disabled. In other words, it is assumed that the check state of the check box 703 has a higher priority that the state of the cloud storage selection in the display area 702.

In S1304, the job control unit 403 performs control such that the image processing unit 404 analyzes the scanned image data, and an attempt is made based on the result of the analysis to detect URL for accessing the cloud storage to acquire a file (an electronic document) corresponding to the scanned image data.

For example, the image processing unit 404 may recognize URL information given in S1205 in a particular description format (for example, a two-dimensional bar code format, etc.) to the cover page added to the target data, and may identify the URL based on the recognized URL information.

In a specific example, an image analysis may be performed on a partial image in a particular area, corresponding to a particular area of the document (the printed matter), of the scanned image obtained as a result of reading the document, thereby recognizing URL information described in the partial image.

The scanned image obtained as the result of reading the document is an example of the "first image", and the process in S1304 is an example of a "first identification process".

In a case where the URL is successfully identified, the job control unit 403 accesses the cloud storage corresponding to the URL via the cloud storage communication unit 405, and tries to acquire the file (the electronic document) corresponding to the above-described data. In this process, the job control unit 403 may acquire account information which corresponds to the target cloud storage and which is stored in a particular storage area by the data storage unit 402, and may use the account information in authentication for accessing the cloud storage.

Thereafter, the job control unit 403 determines whether or not the file corresponding to the scanned image data has been successfully acquired from the cloud storage.

In a case where the job control unit 403 determines in S1304 that the acquisition of the target file corresponding to the scanned image data from the cloud storage has failed, the processing proceeds to S1320. In a specific example, a failure of the acquisition of the target file in S1304 may occur, for example, when the access to the cloud storage fails, or the authentication fails, or the target file does not exist on the cloud storage. In this case, the job control unit 403 cannot acquire the target file to be subjected to the revision performed such that the revision is performed in S1305 to S1317 described later on the data obtained as the result of reading the document and the result of the revision made on the data is applied to the target file.

In S1320, the job control unit 403 instructs the data storage unit 402 to store, in a particular storage area, the history of the process related to the job. Note that in the present example, information indicating the failure of the process related to the cloud scan is stored as the history of the process related to the job. After that, the series of processing steps shown in FIGS. 13A and 13B is ended.

On the other hand, in a case where the job control unit 403 determines in S1304 that the target file corresponding to the scanned image data is successfully acquired from the cloud storage, the processing proceeds to S1305. In S1305, the job control unit 403 requests the image processing unit 404 to generate a rendered image of the file (the electronic document) acquired in S1304. In response to receiving this request, the image processing unit 404 generates the rendered image by rendering the file. In the present embodiment, for convenience, it is assumed by way of example that the file is an electronic document in a text format or an electronic document described in a particular markup language (for example, XML (Extensible Markup Language)). It is also assumed by way of example that the data of the rendered image is in the bitmap format.

Note that the rendered image corresponds to an example of a "second image".

In S1306, the image processing unit 404 compares the scanned image obtained as the result of reading the document in S1301 with the rendered image generated in S1305, and acquires a difference image according to the result of the comparison.

Note that there is a possibility that the size and/or the resolution are different between the scanned image and the rendered image. When there is such a difference, the image processing unit 404 may adjust the size and/or the resolution of at least one of the scanned image and the rendered image. In a specific example, the image processing unit 404 may generate the rendered image while controlling the size and/or the resolution of the rendered image according to the size and/of the resolution of the scanned image.

To handle a possible situation in which the scanned image is inclined with respect to the rendered image, the image processing unit 404 may adjust the inclination of at least one of the scanned image and the rendered image. In a specific example, the image processing unit 404 may extract the difference between the rendered image and the scanned image while rotating the rendered image, and may determine that a rotation angle at which the difference is minimum indicates the inclination angle between the scanned image and the rendered image.

In S1307, the image processing unit 404 recognizes the difference image acquired in S1306 thereby obtaining an image (a "written-note image") indicting information additionally written on the printed matter obtained by printing the electronic document which is the source from which the rendered image is generated. The image processing unit 404 decomposes the written-note image into a natural language part and a proofreading symbol part written as a result of reviewing the printed matter of the electronic document.

Examples of the proofreading symbols include symbols defined in ISO5776 by the International Organization for Standardization, symbols defined in JIS Z 8208 by the Japanese Industrial Standards.

There is no particular restriction on the method of decomposing the written-note image into proofreading symbols and natural languages. In a specific example, a recognition tool may be built by learning features of proofreading symbols and natural languages by so-called machine learning, and the written-note image may be decomposed into a proofreading symbol part and a natural language part by pattern matching using the recognition tool.

Furthermore, the image processing unit 404 performs various analysis processes (for example, image analysis) on the proofreading symbols and the natural languages extracted from the written-note image via the decomposition process, thereby recognizing the correction instructions indicated by the proofreading symbols and converting the natural languages into text information. The conversion of the natural language into text information can be realized by, for example, OCR (Optical Character Recognition) processing.

For example, the natural language written on the printed matter during the review process may be used together with the proofreading symbols, and plays a supplementary role such as presentation of revision candidates.

The process in S1306 and S1307 corresponds to an example of a "second identification process".

In S1308, the image processing unit 404 identifies the coordinates of a proofreading symbol on the rendered image. Note that in the present disclosure, the coordinates on the rendered image indicate an area surrounded by four points represented X-axis and Y-axis coordinates on a bitmap given by a two-dimensional array. Since the written-note image (the difference image) can be obtained by comparing the scanned image with the rendered image in S1306, it is possible identify the positional correspondence between the rendered image and the rendered image.

In S1309, the image processing unit 404 extracts, from the rendered image, an area corresponding to the coordinates identified in S1308. As described above, the rendered image is an image generated by rendering the electronic document of the revision reflection target to which the result of revision is to be reflected (that is, the electronic document corresponding to the printed matter on which the review note is written during the reviewing). Therefore, it is expected that the extracted area includes a character string specified as a correction target by the user in the reviewing.

In S1310, the image processing unit 404 identifies the character string presented in the area extracted in S1309 from the rendered image. Note that data of the area extracted in S1309 is image data in the bitmap format or the like. Therefore, the image processing unit 404 may identify the character string presented in the above-described area by, for example, performing OCR processing on the area (that is, the image in the bitmap format or the like). The image processing unit 404 may convert the character string identified in the above-described area into text information and may hold the resultant character string in the text format.

In S1311, the image processing unit 404 searches the electronic document of the revision reflection target, to which the revision is to be reflected, to find a character string identical to the character string identified in S1310 (that is, a character string identical to the character string presented in the area of the rendered image). In a specific example, the image processing unit 404 may search the target electronic document for the character string converted into text information in S1310 by comparing it with the text information indicating the content of the target electronic document to which the revision is to be reflected.

In S1312, the image processing unit 404 identifies at least part of character string candidates found in the electronic document of the revision reflection target in the search in S1311 and specifies it as a candidate of a character string to which the revision is to be reflected. Thereafter, the image processing unit 404 performs processing on the electronic document such that the character strings of the correction reflection candidates, to which the correction is to be reflected, are displayed in a display mode different from a display mode in which other character strings are displayed.

In the present embodiment, it is assumed by way of example that the image processing unit 404 performs processing on the electronic document of the revision reflect target such that the character strings of the correction reflection candidates are highlighted.

The process related to the highlighting of the character strings specified as the correction reflection candidates may be changed appropriately depending on the format of the electronic document of the revision reflection target.

In a specific example, in a case where the electronic document of the revision reflection target is described in a particular markup language, a highlight attribute according to the format of the markup language may be assigned to the character string candidate.

In another specific example, in a case where the electronic document of the revision reflection target is described in a text format, an occurrence position, in the electronic document, of each character string specified as the correction reflection candidate may be identified, and information indicating the occurrence position may be stored in a particular storage area. An example of information indicating the occurrence position in the text file is information indicating a range of the occurrence the start and end positions of which are indicated by the numbers of characters as counted from the beginning of the file. The information indicating the occurrence position is used to specify the position to be highlighted when the electronic document is rendered.

By performing the process related to control of display mode such as the highlighting process as described above, when a similar character string occurs at a plurality of positions in the electronic document of the revision reflection target, it is possible to show the character strings which are candidates to which the correction is to be reflected. Details of this process will be described later.

In S1313, the image processing unit 404 generates a rendered image by rendering the electronic document that has been subjected in S1312 to the process for highlighting the character strings specified as the candidates to which the correction is to be reflected.

In a case where the electronic document is described in a particular markup language, the rendering process may be performed in a usual manner such that an area corresponding to each character string specified as the correction reflection candidate is highlighted.

In another example, in a case where the electronic document is described in the text format, the process for highlighting is executed when the rendering is performed. More specifically, when the rendered image is generated, a process is performed such that the background color of the area corresponding to each character string specified as the correction reflection candidate is changed based on the information indicating the occurrence position of the character string specified as the correction reflection candidate.

Note that the rendered image generated by rendering the electronic document that has been subjected to the process related to the control of the display mode, such as highlighting as described above, corresponds to an example of a "third image".

In S1314, the image processing unit 404 compares the rendered image generated in S1305 with the rendered image generated in S1313. The image processing unit 404 then identifies the coordinates of an area in the rendered image generated in S1305 corresponding to the highlighted area in the rendered image generated in S1313 based on the result of the comparison.

In S1315, the image processing unit 404 determines whether or not the coordinates of the highlighted area identified in S1314 are equal to the coordinates of the proofreading symbol identified in S1308. The size of the highlighted area is not always equal to the size of the proofreading symbol area. To handle such a situation, for example, the image processing unit 404 may perform the determination such that when one of the area that partially overlaps with the other area with a ratio equal to or greater than a predetermine value (for example, 50% or greater), the two areas may be regarded as equal in position.

In a case where the image processing unit 404 determines in S1315 that the coordinates of the highlighted area are not equal to the coordinates of the proofreading symbol, the processing proceeds to S1312. In this case, the image processing unit 404 identifies another candidate, and executes the processes in step S1312 and following steps for the identified other candidate.

On the other hand, in a case where the image processing unit 404 determines in S1315 that the coordinates of the highlighted area and the coordinates of the proofreading symbol are equal to each other, the process proceeds to S1316.

The process related to the identification of the correction reflection candidate in S1308 to S1315 corresponds to an example of a "third identification process".

In S1316, the image processing unit 404 corrects the character string specified in S1312 as the correction reflection candidate in the electronic document according to the content indicated by the proofreading symbol. In a specific example, in a case where the proofreading symbol is a strikethrough, the image processing unit 404 deletes the character string specified as the correction reflection candidate. In another example, in a case where the proofreading symbol indicates to replace the character string by another character string, the image processing unit 404 replaces the character string specified as the correction reflection candidate with the specified character string.

In S1317, the job control unit 403 transmits the electronic document which has been subjected in S1316 to the revision process to the cloud storage via the cloud storage communication unit 405, and instructs the cloud storage to update the electronic document which is the revision reflection target. As a result, the electronic document of the revision reflection target stored in the cloud storage is overwritten by the electronic document transmitted from the job control unit 403 (that is, the electronic document revised in S1316).

Note that in a case where the cloud storage manages versions of electronic documents, the electronic document revised via the overwriting process is treated as a new version of the electronic document of the revision reflection target. By managing the versions, for example, it becomes possible to perform control such that an electronic document stored in the cloud storage is returned to an old version in a form which has not yet been subjected to the overwriting process, or such that a difference between old and new versions is presented, that is, the content of the revision is presented.

In S1318, the job control unit 403 performs control such that the data storage unit 402 stores the history of the process related to the series of jobs described above in a particular storage area. The information stored as the history includes, for example, information regarding the file name of the electronic document of the revision reflection target, the processing date and time, the success/failure of the processing, and/or the like displayed on the history confirmation screen 1001 shown in FIG. 10. In the present example, information indicating the success of the processing related to the cloud scan is stored as the history related to the processing of the job.

By performing the processing in the above-described manner, for example, even in a case where information indicating a correction to be made is hand-written on the printed matter of the electronic document, it is possible to automatically revise the electronic document stored in the cloud storage according to the contents of the revision indicated by the hand-written information. Thus, for example, it becomes possible to reflect the result of the revision to the target electronic document without a user having to perform complicated work such as a manual typing operation using a keyboard or the like to electronically transcribe the contents of the information hand-written on the printed matter of the electronic document.

Second Embodiment

An information processing system according to a second embodiment is described below. In the first embodiment described above, in the execution of the cloud scan, searching is performed repeatedly to find a character string identical to a correction reflection candidate from a plurality of character strings retrieved from the electronic document. In the second embodiment, the electronic document is processed in terms of the display mode such that a plurality of character strings found, as correction reflection candidates, in the electronic document are displayed in different modes from each other. This makes it possible to identify the character strings of the correction reflection candidates without performing the searching repeatedly.

More specifically, in the second embodiment, the character strings of the correction reflection candidates found in the electronic document via the search are highlighted in colors different from each other thereby identifying the character strings of the correction reflection candidates.

The second embodiment is described below with a focus on differences from the first embodiment, and a further detailed description of the same parts as in the first embodiment will be omitted.

Figure 14A:
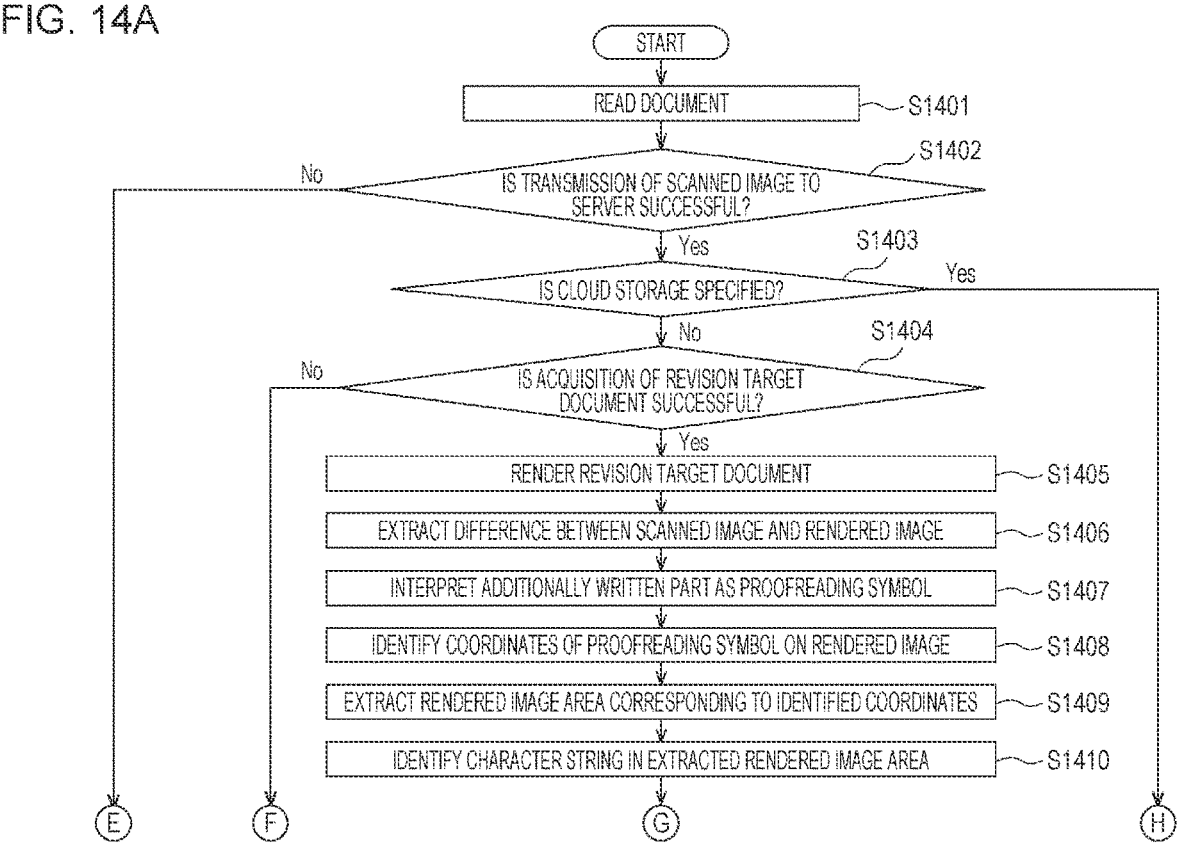
FIGS. 14A and 14B illustrate a flowchart of an example of a scanning process according to one or more aspects of the present disclosure.
Figure 14B:
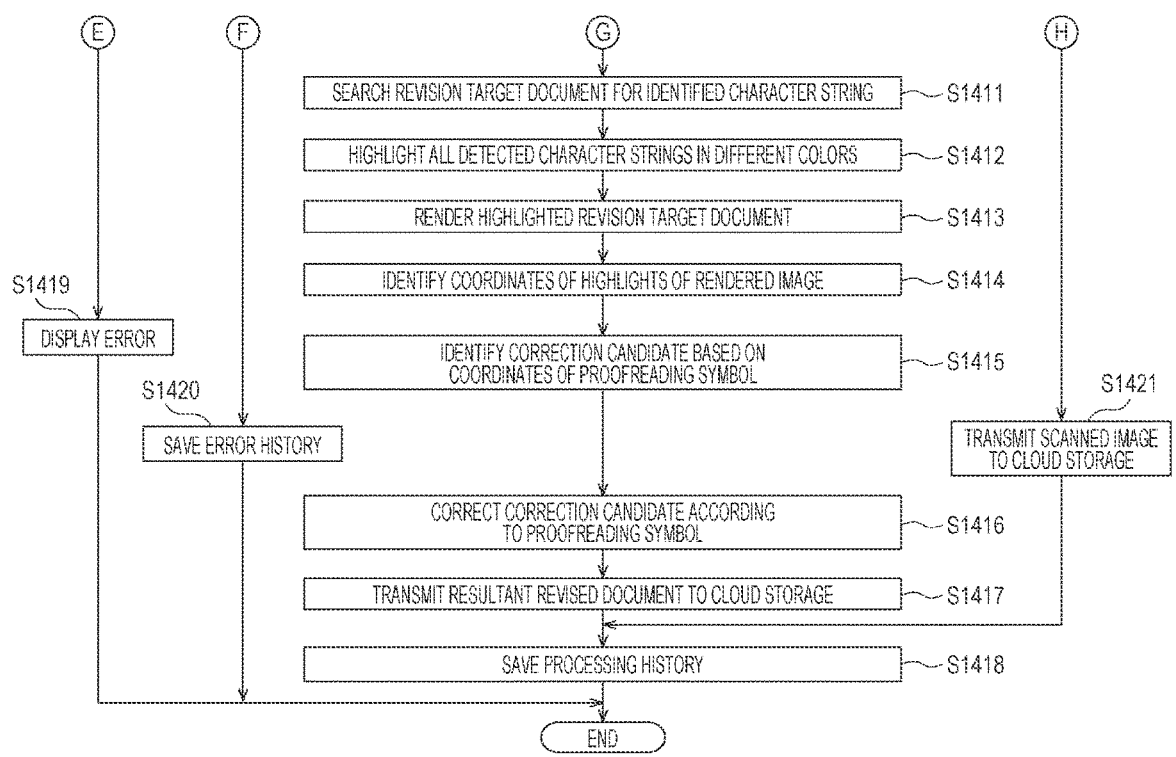

FIGS. 14A and 14B show a flowchart of an example of a process performed by an information processing system according to the second embodiment, for a case where a process related to the realization of the cloud scan function is performed. A series of processing steps shown in FIGS. 14A and 14B is started, for example, when the button 704 is pressed on the cloud scan screen 701 shown in FIG. 7.

In S1401, the operation control unit 301 registers, in the job control unit 303, the content of the could scan process according to the selection state of the cloud storage in the display area 702 and the check state of the check box 703 on the cloud scan screen 701.

The job control unit 303 requests the reading processing unit 306 to execute a process related to reading a document placed on the scanner unit 104 according to the registered processing contents. In response to this request, the reading processing unit 306 controls the operation of the scanner unit 104 to execute the process related to reading the document placed on the reading plate of the scanner unit 104.

In S1402, the MFP server communication unit 310 transmits the data obtained as a result of reading the document in S1401 (that is, the scanned image data) to the MFP server 120 and requests the MFP server 120 to process it. In this process, the information about the cloud storage selected in the display area 702 and the information about the check state of the check box 703 are also notified to the MFP server 120.

The MFP server communication unit 310 determines whether or not the data obtained as the result of reading the document has been successfully transmitted to the MFP server 120.

In a case where the MFP server communication unit 310 determines in S1402 that the transmission of the data obtained as the result of reading the document to the MFP server 120 has failed, the processing proceeds to S1419. In S1419, the operation control unit 301 of the MFP 100 performs control such that information about an occurrence of an error is displayed in the display area 705 of the cloud scan screen 701. After that, the series of processing steps shown in FIGS. 14A and 14B is ended.

On the other hand, in a case where the MFP server communication unit 310 determines in S1402 that the transmission of the data obtained as the result of reading the document to the MFP server 120 is successful, the processing proceeds to S1403.

In S1403, the MFP communication unit 406 receives the processing request transmitted from the MFP 100, and registers the processing content corresponding to the processing request in the job control unit 403. Based on the registered information of the attribute of the processing request, the job control unit 403 determines whether the cloud storage is specified as the transmission destination to which the data obtained as the result of reading the document it to be transmitted or it is specified that the URL information is to be associated with the data obtained as the result of reading the document.

In a case where the job control unit 403 determines in S1403 that it is not specified that the URL information is associated with the data obtained as the result of reading the document but the cloud storage is specified as the transmission destination, the processing proceeds to S1421. In S1421, the job control unit 403 transmits the data obtained as the result of reading the document (in other words, the scanned image data) to the cloud storage specified as the transmission destination via the cloud storage communication unit 405.

On the other hand, in a case where the job control unit 403 determines in S1403 that it is specified that the URL information is to be associated with the data obtained as the result of reading the document (hereinafter also referred to simply as the scanned image data), the processing proceeds to S1404.

In S1404, the job control unit 403 performs control such that the image processing unit 404 analyzes the scanned image data, and an attempt is made based on the result of the analysis to detect URL for accessing the cloud storage to acquire a file (an electronic document) corresponding to the scanned image data.

Thereafter, the job control unit 403 determines whether or not the file corresponding to the scanned image data has been successfully acquired from the cloud storage.

In a case where the job control unit 403 determines in S1404 that the acquisition of the target file corresponding to the scanned image data from the cloud storage has failed, the processing proceeds to S1420. In a specific example, a failure of the acquisition of the target file in S1404 may occur, for example, when the access to the cloud storage fails, or the authentication fails, or the target file does not exist on the cloud storage.

In S1420, the job control unit 403 instructs the data storage unit 402 that the history related to the processing of the job is to be stored in the particular storage area. Note that in this specific case, information indicating the failure of the processing related to the cloud scan is stored as the history related to the processing of the job. After that, the series of processing steps shown in FIGS. 14A and 14B is ended.

On the other hand, in a case where the job control unit 403 determines in S1404 that the target file corresponding to the scanned image data is successfully acquired from the cloud storage, the processing proceeds to S1405. In S1405, the job control unit 403 requests the image processing unit 404 to generate a rendered image of the file (the electronic document) acquired in S1404. In response to receiving this request, the image processing unit 404 generates the rendered image by rendering the file.

In S1406, the image processing unit 404 compares the scanned image obtained as the result of reading the document in S1401 with the rendered image generated in S1405, and acquires a difference image according to the result of the comparison.

In S1407, the image processing unit 404 recognizes the difference image acquired in S1406 thereby obtaining a written-note image indicting information additionally written on the printed matter obtained by printing the electronic document which is the source from which the rendered image is generated.

In S1408, the image processing unit 404 identifies the coordinates of a proofreading symbol on the rendered image.

In S1409, the image processing unit 404 extracts an area corresponding to the coordinates identified in S1408 from the rendered image.

In S1410, the image processing unit 404 identifies a character string presented in the area extracted in S1409 from the rendered image.

In S1411, the image processing unit 404 searches the electronic document of the revision reflection target to which the revision is to be reflected for a character string identical to the character string identified in S1410.

In S1412, the image processing unit 404 processes the electronic document of the revision reflection target such that character strings specified as correction reflection candidates found in S1411 in the electronic document are displayed in display modes different from each other. In this process, the image processing unit 404 controls the display modes of the respective candidates such that each of the candidates is displayed in a different mode from the other candidates.

In the present embodiment, as described above, the image processing unit 404 performs processing on the target electronic document such that character strings specified as the correction reflection candidates are highlighted. More specifically, the image processing unit 404 performs processing on the target electronic document such that each of the character strings of the correction reflection candidates found in the search is highlighted in a color different from the other candidates. Note that the rules of determining a highlight color for each candidate found in the search may be set in advance.

In S1413, the image processing unit 404 generates a rendered image by rendering the electronic document that has been subjected to the process for highlighting the character strings corresponding to the respective candidates found in the search in S1412.

In S1414, the image processing unit 404 compares the rendered image generated in S1405 with the rendered image generated in S1413. The image processing unit 404 then identifies the coordinates of an area in the rendered image generated in S1405 corresponding to the highlighted area in the rendered image generated in S1413 based on the result of the comparison.

In S1415, the image processing unit 404 identifies, from areas corresponding the respective highlighted candidates identified in S1414, an area the coordinates of which are equal to the coordinates of the proofreading symbol identified in S1408. The image processing unit 404 then identifies a correction reflection candidate from the plurality of retrieved candidates highlighted in S1412 based on the highlight colors applied to the areas.

In S1416, the image processing unit 404 corrects the character string identified in S1415 as the correction reflection candidate in the electronic document according to the content indicated by the proofreading symbol.

In S1417, the job control unit 403 transmits the electronic document having been subjected to the correction in S1416 to the cloud storage via the cloud storage communication unit 405, and instructs the cloud storage to update the electronic document specified as the revision reflection target. As a result, the electronic document of the revision reflection target stored in the cloud storage is overwritten by the electronic document transmitted from the job control unit 403 (that is, the electronic document revised in S1416).

In S1418, the job control unit 403 performs control such that the data storage unit 402 stores the history of the processing related to the plurality of jobs described above in a particular storage area. The information stored as the history includes, for example, information regarding the file name of the electronic document of the revision reflection target, the processing date and time, the success/failure of the processing, and/or the like displayed on the history confirmation screen 1001 shown in FIG. 10. In the present example, information indicating the success of the processing related to the cloud scan is stored as the history related to the processing of the job.

By performing the processes in the above-described manner, for example, even in a case where information indicating a correction to be made is hand-written on the printed matter of the electronic document, it is possible to automatically correct the electronic document stored in the cloud storage according to the contents of the correction indicated by the hand-written information. Thus, for example, it becomes possible to reflect the result of the review to the target electronic document without a user having to perform complicated work such as a manual typing operation using a keyboard or the like to electronically transcribe the contents of the information hand-written on the printed matter of the electronic document.

Third Embodiment

An information processing system according to a third embodiment is described below. A further detailed description of the same parts as in the first embodiment will be omitted.

The information processing system according to the third embodiment has the same configuration as that according to the first embodiment described above with reference to FIG. 1. The hardware configuration of the MFP 100 according to the third embodiment is the same as that according to the first embodiment described above with reference to FIG. 2. The software configuration of the MFP 100 according to the third embodiment is the same as that according to the first embodiment described above with reference to FIG. 3. The software configuration of the MFP server 120 according to the third embodiment is the same as that according to the first embodiment described above with reference to FIG. 4.

Examples of user interfaces of the information processing system according to the third embodiment are described below. When a user causes an IC card reader of the MFP 100 to read an IC card of the user to try to log in to the MFP 100, the login screen shown in FIG. 5 is displayed as in the first embodiment. When the button 503 is pressed on the menu screen 501 shown in FIG. 5, the cloud print screen 601 shown in FIG. 6 is displayed on the operation unit 102 as in the first embodiment.

Figure 15:
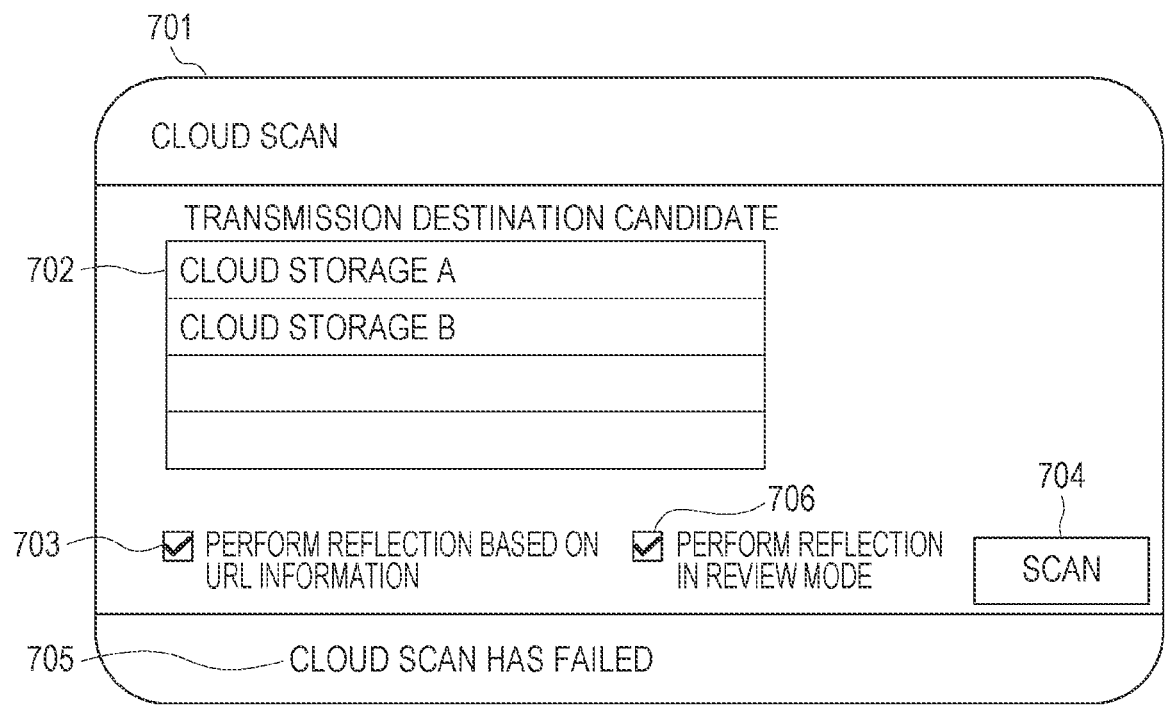
FIG. 15 is a diagram illustrating an example of a cloud scan screen according to one or more aspects of the present disclosure.

When the button 504 is pressed on the menu screen 501 shown in FIG. 5, the cloud scan screen 701 shown in FIG. 15 is displayed. The cloud scan screens 701 to 705 according to the third embodiment shown in FIG. 15 are the same as the cloud scan screens 701 to 705 according to the first embodiment shown in FIG. 7, and thus a further description thereof is omitted.

In a situation in which information obtained as a result of reading a printed document and the information is reflected to a source file from which the document is printed, a check box 706 in FIG. 15 provides a user interface for a user to specify a method of reflecting the information. For example, in a case where the check box 706 is checked, the information obtained as a result of reading the document is added as review information to the source file without overwriting the source file according to the information. Note that in the third embodiment, the "review information" corresponds to information indicating a correction made on an electronic document in an operation in a review mode using particular software having an editing function (a document editing application). In a case where the check box 706 is not checked, the information obtained as a result of reading the document is reflected to the target file of the document, which is the source from which the document is printed, by overwriting the target file of the document according to the information.

When the button 704 is pressed, a document is read under the control of the reading processing unit 306, and data (a file) obtained as a result of the reading is transmitted to the MFP server 120. In this transmission process, information related to the instructions given by the user via the display area 702 and the check boxes 703 and 706 is also transmitted, in association with the data obtained as the result of the reading, to the MFP server 120.

Figure 16A:
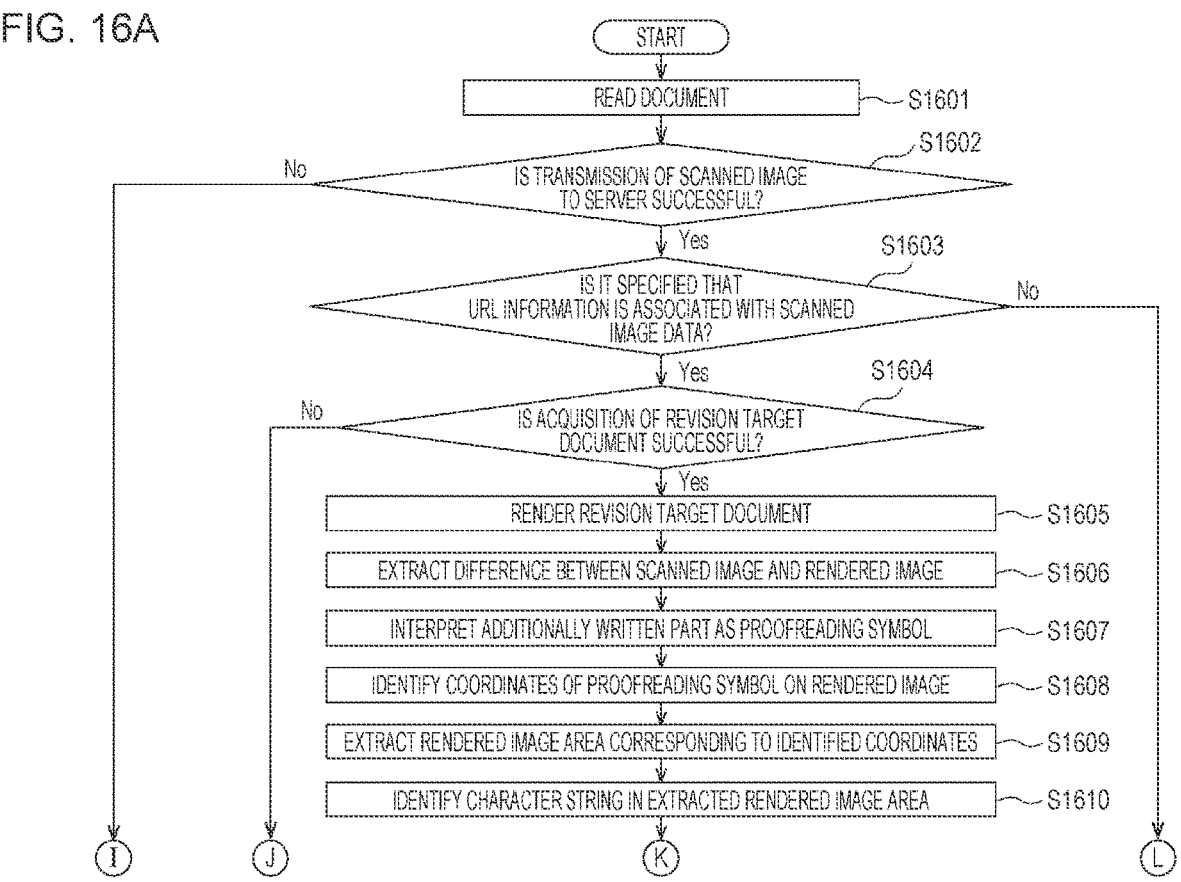
FIGS. 16A and 16B illustrate a flowchart of an example of a scanning process according to one or more aspects of the present disclosure.
Figure 16B:
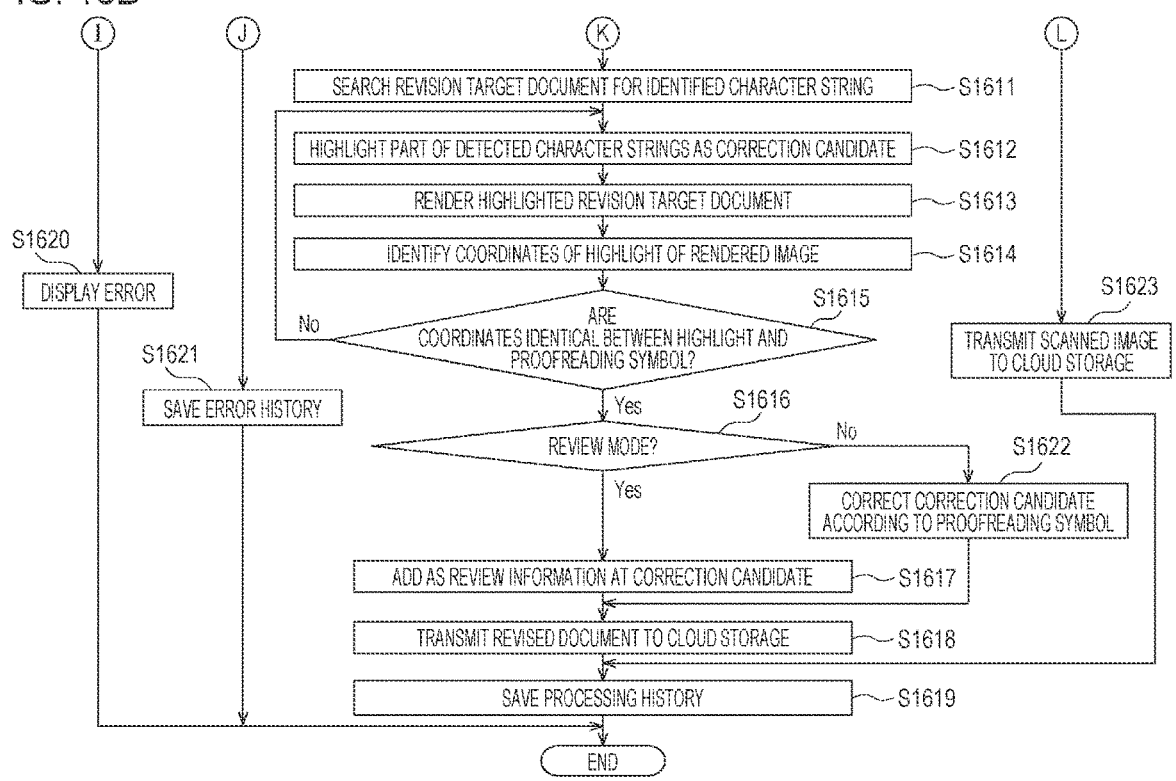

An example of a process performed by the information processing system according to the third embodiment is described below with reference to FIGS. 16A and 16B with a focus on the cloud scan function. A series of processing steps shown in FIGS. 16A and 16B is started, for example, when the button 704 is pressed on the cloud scan screen 701 shown in FIG. 15.

In S1601, the operation control unit 301 registers, in the job control unit 303, the content of the could scan process according to the selection state of the cloud storage in the display area 702 and the check states of the check boxes 703 and 706 on the cloud scan screen 701. The selection state of the cloud storage and the check states of the check boxes 703 and 706 in the display area 702 may be registered, for example, as attributes of the processing contents. The process in S1601 in FIG. 16A is different from the process in S1301 in FIG. 13A in that the information related to check state of the check box 706 in FIG. 15 is registered.

The job control unit 303 requests the reading processing unit 306 to execute a process related to reading a document placed on the scanner unit 104 according to the registered processing contents. In response to receiving this request, the reading processing unit 306 controls the operation of the scanner unit 104 to execute the process related to reading the document placed on the reading plate of the scanner unit 104.

The scanned image obtained as a result of reading the document is output as data (a file), for example, in a bitmap format in which information obtained by optically reading the document is arranged two-dimensionally.

In S1602, the MFP server communication unit 310 transmits the data obtained as the result of reading the document in S1601 (that is, the scanned image data) to the MFP server 120 and requests the MFP server 120 to process it. In this process, the information about the cloud storage selected in the display area 702 and the information about the check states of the check boxes 703 and 706 are also notified to the MFP server 120. The MFP server communication unit 310 determines whether or not the data obtained as the result of reading the document has been successfully transmitted to the MFP server 120.

In a case where the MFP server communication unit 310 determines in S1602 that the transmission of the data obtained as the result of reading the document to the MFP server 120 has failed, the processing proceeds to S1620. In S1620, the operation control unit 301 of the MFP 100 performs control such that information about an occurrence of an error is displayed in the display area 705 of the cloud scan screen 701. After that, the series of processing steps shown in FIGS. 16A and 16B is ended.

On the other hand, in a case where the MFP server communication unit 310 determines in S1602 that the transmission of the data obtained as the result of reading the document to the MFP server 120 is successful, the processing proceeds to S1603.

Processes in S1603 to S1615 shown in FIG. 16A or FIG. 16B are the same as the processes in S1303 to S1315 in FIG. 13A or 13B according to first embodiment, and thus a further detailed description thereof is omitted. Processes in S1621 and S1623 in FIG. 16B are the same respectively as the processes of S1320 and S1321 in FIG. 13B

In S1616, the job control unit 403 determines whether a review mode is specified as the operation mode, based on the check state of the check box 706 registered in the job as the content of processing of the cloud scan. More specifically, in a case where the check box 706 is checked, the job control unit 403 determines that the operation is to be performed in the review mode.

In a case where the job control unit 403 determines in S1616 that the specified operation mode is not the review mode, the processing proceeds to S1622. In S1622, the image processing unit 404 corrects the character string, in the electronic document, identified in S1612 as the correction reflection candidate according to the content indicated by the proofreading symbol. In a specific example, in a case where the proofreading symbol is a strikethrough, the image processing unit 404 deletes the character string specified as the correction reflection candidate. In another example, in a case where the proofreading symbol indicates to a replace the character string by another character string, the image processing unit 404 replaces the character string specified as the correction reflection candidate with the specified character string.

On the other hand, in a case where the job control unit 403 determines in S1616 that the specified operation mode is the review mode, the processing proceeds to S1617. In S1617, the image processing unit 404 adds review information such that a description corresponding to a correction indicated by a proofreading symbol is added as the review information to the character string, in the electronic document, identified in S1612 as the correction reflection candidate. For example, in a case where the electronic document is in an XML format, the image processing unit 404 may add information indicating the content of the correction to the electronic document by using an XML tag indicating correction information. In a specific example, in a case where the proofreading symbol is a strikethrough, the image processing unit 404 adds, as review information, an XML tag indicating a deletion to the character string of the correction reflection candidate. In another example, in a case where the proofreading symbol indicates a correction to another character string, the image processing unit 404 adds, as proofreading information, an XML tag to the character string of the revision reflection candidate such that the XML tag indicates the correction to the specified other character string. In a case where the electronic document of the revision reflection target is described in a file format of a specific document editing application, the review information (correction information) may be reflected according to a format of the review function of the document editing application. For example, in a case where the specific document editing application is the Microsoft Word™, the correction content corresponding to the proofreading symbol detected in the scanned image is added as a "revision history (correction history)" using the review function of the application.

In S1618, the job control unit 403 transmits the electronic document, having been subjected in S1617 or S1622 to the correction, to the cloud storage via the cloud storage communication unit 405, and instructs the cloud storage to update the electronic document of the revision reflection target. As a result, the electronic document of the revision reflection target stored in the cloud storage is overwritten by the electronic document transmitted from the job control unit 403 (that is, the electronic document revised in S1617 or S1622).

Note that in a case where the cloud storage manages versions of electronic documents, the electronic document revised via the overwriting process is treated as a new version of the electronic document of the revision reflection target. In a specific example, in a case where the process in S1617 has been executed, the electronic document which has been subjected in S1617 to the reflection of the revision information is added as a new version to the electronic documents of the revision reflection target stored in the cloud storage. By managing the versions in the above-described manner, for example, it becomes possible to perform control such that an electronic document stored in the cloud storage is returned to an old version in a form which has not yet been subjected to the overwriting process, or such that a difference between old and new versions is presented, that is, the content of the revision is presented.

In S1619, the job control unit 403 performs control such that the data storage unit 402 stores the history of the processing related to the plurality of jobs described above in a particular storage area. The information stored as the history includes, for example, information regarding the file name of the electronic document of the revision reflection target, the processing date and time, the information indicating success/failure of the processing. In the present example, information indicating the success of the processing related to the cloud scan is stored as the history related to the processing of the job.

By performing the process in the above-described manner, for example, even in a case where information indicating a correction to be made is hand-written on the printed matter of the electronic document, it is possible to automatically revise the electronic document stored in the cloud storage according to the specified contents of the revision. By performing the process in the above-described manner, for example, even in a case where hand-written information indicating the revision is added to the printed matter of the electronic document, it is possible to automatically revise the electronic document stored in the cloud storage according to the specified contents of the revision.

Fourth Embodiment

An information processing system according to a fourth embodiment is described below. The fourth embodiment is described for a case where, when a correction indicated by a content of a review result is reflected by adding review information to the electronic document, a clip image indicating a content of a review information hand-written on the printed matter is associated as a supplement to the review information.

The fourth embodiment is described below with a focus on differences from the previous embodiments, and a further detailed description of the same parts as in the previous embodiment is omitted.

Figure 17A:
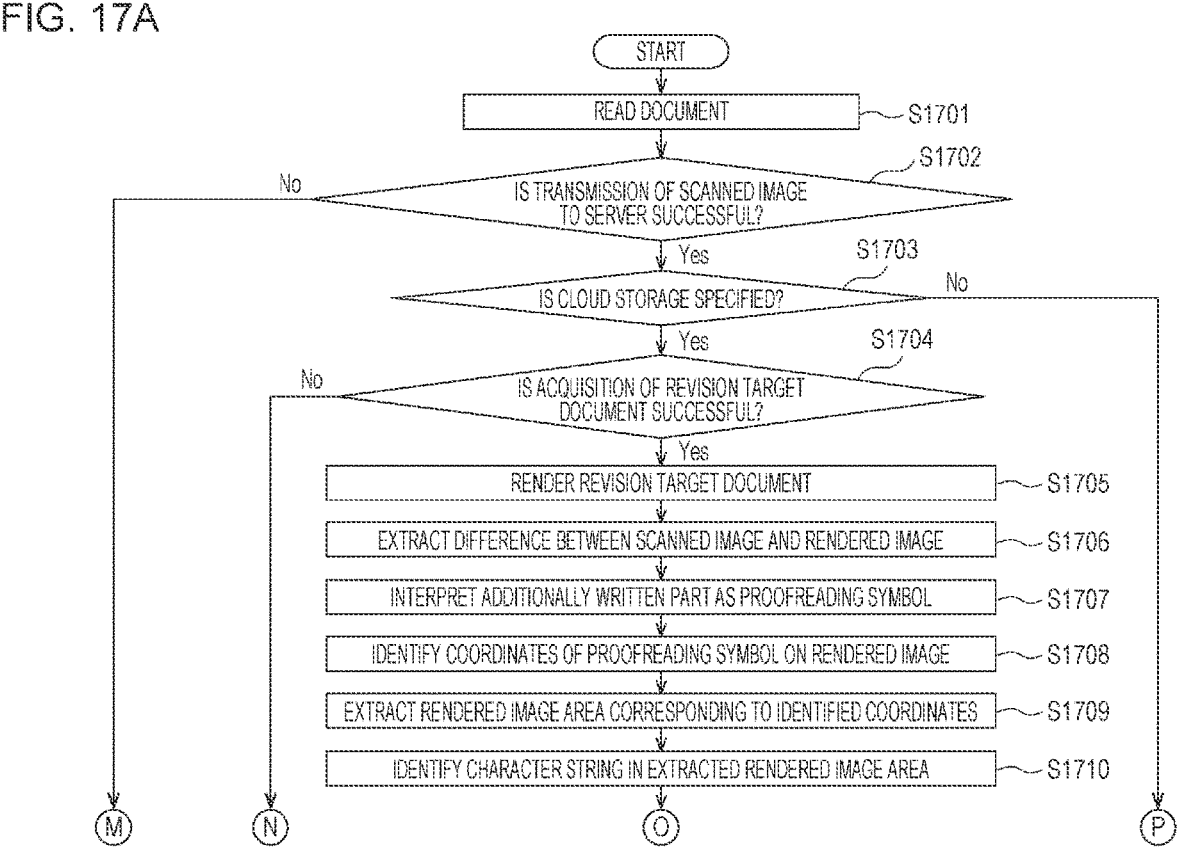
FIGS. 17A and 17B illustrate a flowchart of an example of a scanning process according to one or more aspects of the present disclosure.
Figure 17B:
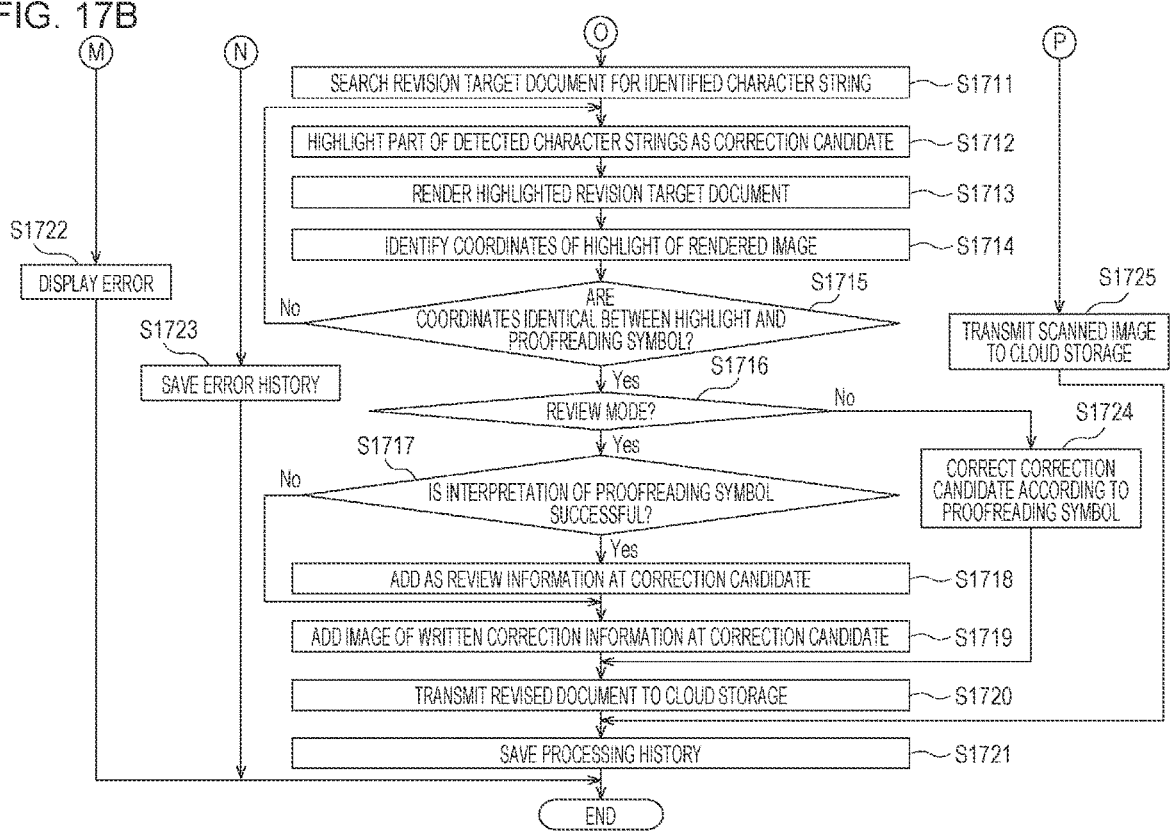

FIGS. 17A and 17B show a flowchart illustrating an example of a process performed by the information processing system according to the fourth embodiment, for a case where a process related to the realization of the cloud scan function is performed. A series of processing steps shown in FIGS. 17A and 17B is started, for example, when the button 704 is pressed on the cloud scan screen 701 shown in FIG. 15.

Processes in S1701 to S1716 shown in in FIG. 17A or FIG. 17B are the same respectively as the processes in S1601 to S1616 shown in FIG. 16A or FIG. 16B, and thus a further detailed description thereof is omitted. Processes in S1722, S1723, and S1725 in FIG. 17B respectively correspond to the processes in S1620, S1621, and S1623 in FIG. 16B.

In a case where the job control unit 403 determines in S1716 that the specified operation mode is not the review mode, the processing proceeds to S1724. In S1724, the image processing unit 404 corrects the character string, in the electronic document, identified in S1712 as the correction reflection candidate according to the content indicated by the proofreading symbol.

On the other hand, in a case where the job control unit 403 determines in S1716 that the specified operation mode is the review mode, the processing proceeds to S1717. In S1717, the image processing unit 404 determines whether or not the recognition of the content of the correction instruction represented by the proofreading symbol decomposed in S1707 from the written-note image is successful.

In a specific example, in a case where it is still difficult to identify a proofreading symbol even after image processing such as pattern matching is performed on a partial image of an area recognized as a proofreading symbol written in the written-note image, the image processing unit 404 may determine that the recognition of the content of the correction instruction has failed.

In a case where, even after image processing such as OCR processing is performed on a partial image of an area recognized as a natural language area in the written-note image, it is still difficult to identify a corresponding character string, the image processing unit 404 may determine that the recognition of the content of the correction instruction has failed. In a case where the character string is successfully identified, the image processing unit 404 may regard that the recognition of the content of the correction instruction is successful even if there is a difference between the identified character string and the true character string due to an erroneous conversion.

In a case where the image processing unit 404 determines in S1717 that the content of the correction instruction indicated by the proofreading symbol decomposed from the written-note image has been successfully recognized, the processing proceeds to S1718. In S1718, the image processing unit 404 adds correction information as review information to the electronic document such that the correction information corresponding to the content indicated by the proofreading symbol is added to the character string identified in S1712 as the correction reflection candidate.

Thereafter, in S1719, the image processing unit 404 performs a process such that a partial image of a part corresponding to the proofreading instruction in the written-note image (the difference image) acquired in S1707 is associated to the review information reflected in S1718 to the electronic document. In a specific example, the image processing unit 404 may extract, from the written-note image, a partial image of an area including a written note image close to the proofreading information, and may associate the extracted partial image to the proofreading symbol.

On the other hand, in a case where the image processing unit 404 determines in S1717 that the recognition of the content of the correction instruction indicated by the proofreading symbol decomposed from the written-note image has failed, the processing proceeds to S1719.

In this case, in S1719, the image processing unit 404 generates review information with which the partial image of the part in which the correction instruction is hand-written is associated, and reflects the generated review information to the character string, in the electronic document, identified in S1712 as the correction reflection candidate.

In S1720, the job control unit 403 transmits the electronic document revised in in S1718, S1719, and S1724 to the cloud storage via the cloud storage communication unit 405. The job control unit 403 then instructs the cloud storage to update the electronic document of the revision reflection target. As a result, the electronic document of the revision reflection target stored in the cloud storage is overwritten by the electronic document transmitted from the job control unit 403 (that is, the electronic document revised in S1718 and S1719, or revised in S1719 or S1724).

In S1721, the job control unit 403 performs control such that the data storage unit 402 stores the history of the processing related to the plurality of jobs described above in a particular storage area. The information stored as the history includes, for example, information regarding the file name of the electronic document of the revision reflection target, the processing date and time, the information indicating success/failure of the processing. In the present example, information indicating the success of the processing related to the cloud scan is stored as the history related to the processing of the job.

By performing the process in the above-described manner, for example, even in a case where information indicating a correction to be made is hand-written on the printed matter of the electronic document, it is possible to automatically reflect the revision to the electronic document stored in the cloud storage according to the specified content of the revision. Furthermore, in the information processing system according to the present embodiment, it is also possible to reflect the revision such that the information indicating corrections to be made is associated as review information to the electronic document stored in the cloud storage.

In the information processing system according to the fourth embodiment, a clip image of a correction instruction hand-written on a printed matter as a result of reviewing is associated with review information Therefore, even when an error occurs in image processing such as OCR processing or the like for recognizing the content of a correction written on the printed matter, a user can determine whether or not the correction is to be reflected by confirming the correction instruction indicated in the clip image.

OTHER EMBODIMENTS

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2020-191666 filed Nov. 18, 2020, and No. 2020-191668 filed Nov. 18, 2020, which are hereby incorporated by reference herein in their entirety.

What is claimed is:

1. An information processing apparatus comprising:
at least one memory that stores instructions; and
at least one processor that executes the instructions,
wherein the at least one processor generates a difference image based on a first image obtained by reading a printed matter and an electronic document corresponding to the printed matter, the electronic document being described in a file format of a predetermined document editing application, and
wherein the at least one processor identifies, based on the difference image, a proofreading symbol relating to a revision additionally written on the printed matter and a character string to be subjected to the revision in the electronic document; and
wherein the at least one processor adds, according to a format of a review function of the document editing application, a content corresponding to the revision to the electronic document based on the identified proofreading symbol and the identified character string to be subjected to the revision.

2. The information processing apparatus according to claim 1, wherein
the at least one processor adds, as a revision history corresponding to the format of the review function of the document editing application, the content corresponding to the revision to the electronic document described in the file format based on the identified proofreading symbol and the identified character string to be subjected to the revision.

3. The information processing apparatus according to claim 1, wherein
the content corresponding to the revision is a clip image which is identified based on the difference image.

4. The information processing apparatus according to claim 1, wherein
the difference image is generated based on a difference between the first image and a second image corresponding to a result of rendering the electronic document.

5. The information processing apparatus according to claim 1, wherein
the electronic document corresponding to the printed matter is identified based on a result of analysis of a partial image corresponding to a particular area in the first image.

6. The information processing apparatus according to claim 1, wherein
the electronic document corresponding to the printed matter is identified based on at least one of a character string indicating a URL or a directory path described in the first image, or a result of analysis on bar code information.

7. The information processing apparatus according to claim 1, wherein
the file format of the electronic document is described in a particular markup language.

8. The information processing apparatus according to claim 7,
wherein the at least one processor identifies,
from character strings included in the electronic document, a candidate for a character string identical to the character string to be subjected to the revision; and
wherein the at least one processor controls to display the identified candidate for the character string in a mode different from a mode in which the other character strings are displayed according to a format of a markup language of the electronic document.

9. An information processing method comprising:
generating a difference image based on a first image obtained by reading a printed matter and an electronic document corresponding to the printed matter, the electronic document being described in a file format of a predetermined document editing application;
based on the difference image, identifying a proofreading symbol relating to a revision additionally written on the printed matter and a character string to be subjected to the revision in the electronic document; and
according to a format of a review function of the document editing application, adding a content corresponding to the revision to the electronic document based on the identified proofreading symbol and the identified character string to be subjected to the revision.

10. A non-transitory computer readable storage medium storing a program for causing a processor of an information processing apparatus to perform:
generating a difference image based on a first image obtained by reading a printed matter and an electronic document corresponding to the printed matter the electronic document being described in a file format of a predetermined document editing application;

based on the difference image, identifying a proofreading symbol relating to a revision additionally written on the printed matter and a character string to be subjected to the revision in the electronic document; and according to a format of a review function of the document editing application, adding a content corresponding to the revision to the electronic document based on the identified proofreading symbol and the identified character string to be subjected to the revision.

\* \* \* \* \*